(12) United States Patent
Kai

(10) Patent No.: US 8,210,782 B2
(45) Date of Patent: Jul. 3, 2012

(54) MACHINE TOOL

(75) Inventor: Hisahiro Kai, Fukuyama (JP)

(73) Assignee: Horkos Corp., Fukuyama (JP)

( * ) Notice: Subject to any disclaimer, the term of this patent is extended or adjusted under 35 U.S.C. 154(b) by 1259 days.

(21) Appl. No.: 11/886,076

(22) PCT Filed: Mar. 7, 2006

(86) PCT No.: PCT/JP2006/304327
§ 371 (c)(1),
(2), (4) Date: Sep. 11, 2007

(87) PCT Pub. No.: WO2006/100898
PCT Pub. Date: Sep. 28, 2006

(65) Prior Publication Data
US 2008/0187406 A1 Aug. 7, 2008

(30) Foreign Application Priority Data

Mar. 18, 2005 (JP) .................................. 2005-079858
Nov. 2, 2005 (JP) .................................. 2005-319705

(51) Int. Cl.
*B23C 1/06* (2006.01)
*B23C 1/14* (2006.01)
*B23Q 3/00* (2006.01)
*B23Q 1/01* (2006.01)
*B23Q 1/03* (2006.01)
*B23Q 3/157* (2006.01)

(52) U.S. Cl. ........ 409/235; 409/212; 409/168; 409/134; 409/137; 409/219; 483/56; 29/27 R

(58) Field of Classification Search .................. 409/235, 409/168, 202, 212, 221, 137, 134, 224, 219; 408/234, 71; 483/56; 29/27 C, 27 R, 26 A; B23C 1/06

See application file for complete search history.

(56) References Cited

U.S. PATENT DOCUMENTS
3,200,470 A 8/1965 Müller
(Continued)

FOREIGN PATENT DOCUMENTS
JP 1-146631 6/1989
(Continued)

OTHER PUBLICATIONS

Machine Translation of JP 2001-225234, which JP '234 was published Aug. 2001.n.*

*Primary Examiner* — Erica E Cadugan
(74) *Attorney, Agent, or Firm* — Merek, Blackmon & Voorhees, LLC

(57) ABSTRACT

A machine tool, wherein the front face of a base of the machine tool is formed in a single plane and a jig for fixing a workpiece to be machined with a tool is installed extending forwardly from a vertical intermediate front part of the base that defines an area between right and left lateral end front parts of the base having the vertical overall length portions or the vertical roughly overall length portions at right and left end parts of the front face formed in the single plane is formed detachably from the other portions of the base. The jig for fixing the work machined with the tool may be installed in the state of being extended from the vertical intermediate position of the front face in a forward direction.

8 Claims, 40 Drawing Sheets

U.S. PATENT DOCUMENTS

| | | | |
|---|---|---|---|
| 4,358,888 A * | 11/1982 | Zankl et al. | 483/54 |
| 4,620,347 A * | 11/1986 | Stark et al. | 483/56 |
| 5,117,552 A | 6/1992 | Babel | |
| 5,172,464 A * | 12/1992 | Kitamura et al. | 29/563 |
| 5,678,291 A * | 10/1997 | Braun | 29/26 A |
| 5,762,594 A * | 6/1998 | Hoppe | 483/56 |
| 5,909,988 A | 6/1999 | Hoppe et al. | |
| 6,022,009 A * | 2/2000 | Hill | 269/47 |
| 6,210,085 B1 * | 4/2001 | Haninger | 409/135 |
| 6,428,453 B1 * | 8/2002 | Hoppe et al. | 483/58 |
| 2004/0121890 A1 | 6/2004 | Taga et al. | |
| 2009/0160388 A1 * | 6/2009 | Zagromski | 318/570 |

FOREIGN PATENT DOCUMENTS

| | | |
|---|---|---|
| JP | 10-180523 | 7/1998 |
| JP | 2968938 B2 * | 11/1999 |
| JP | 2001-225234 A * | 8/2001 |
| JP | 2004-160584 | 6/2004 |
| JP | 2004-223683 | 8/2004 |

\* cited by examiner

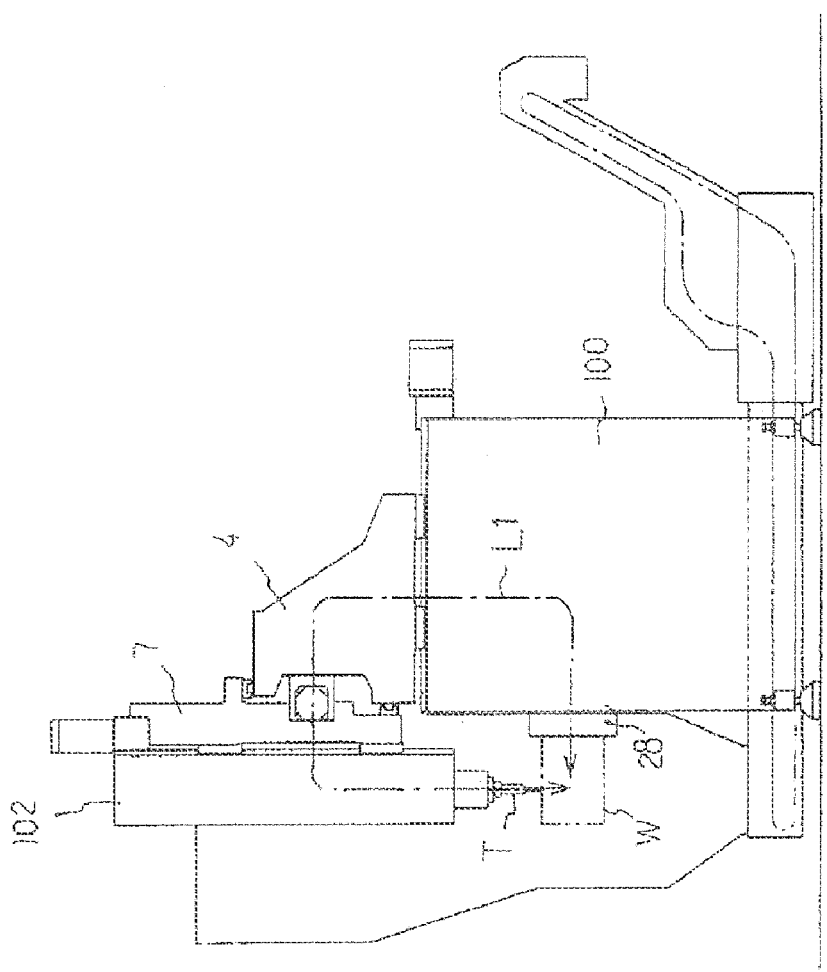

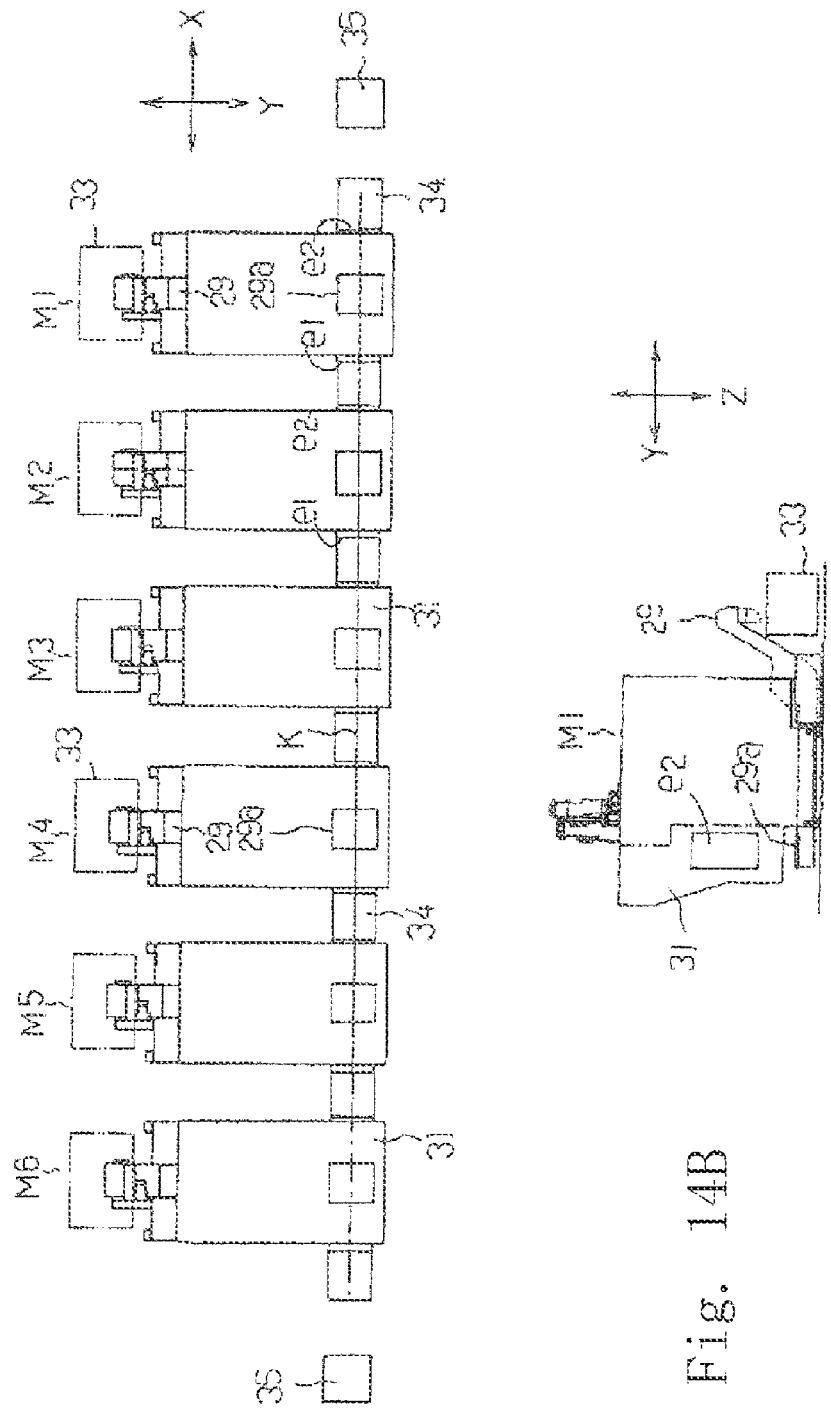

PRIOR ART

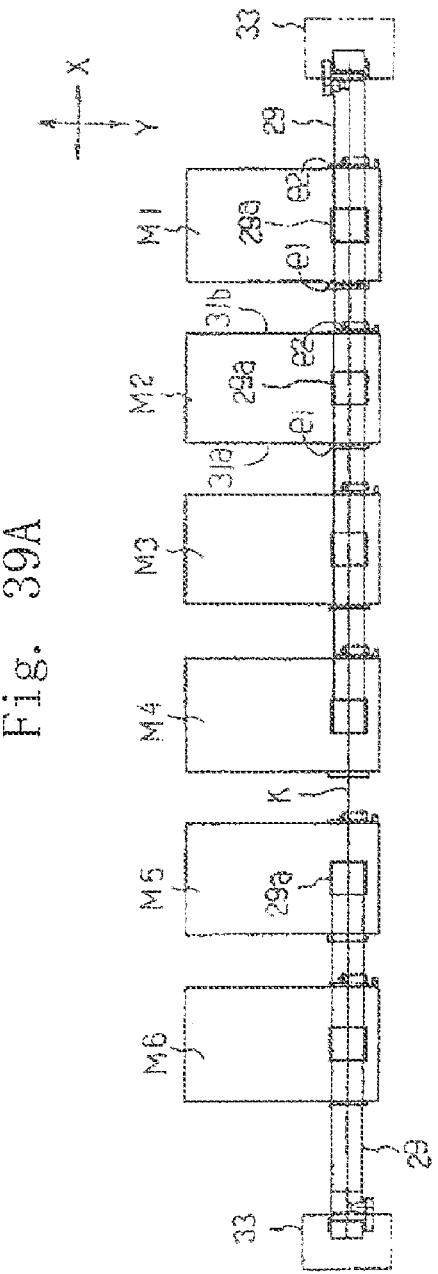
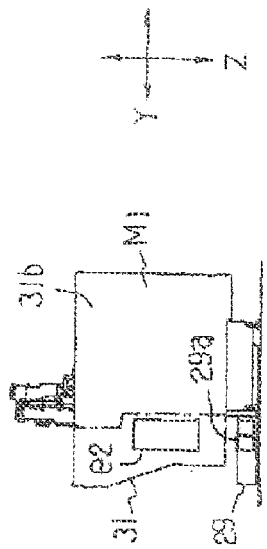
Fig. 39A
Fig. 39B

PRIOR ART

US 8,210,782 B2

MACHINE TOOL

CROSS-REFERENCE TO RELATED APPLICATION

The present application claims the priority under 35 U.S.C. 119 of Japanese Patent Application No. 2005-079858, filed Mar. 18, 2005, and Japanese Patent Application No. 2005-319705, filed Nov. 2, 2005, which are hereby incorporated herein by reference in their entireties.

FIELD OF THE INVENTION

The invention relates to a machine tool (machining center) comprising a base fixed on a floor, a machining head having a vertically rotating shaft with a tool at the bottom thereof and a guide-driving means formed on the top face of the base. The guide-driving means displaces the machining head in a longitudinal direction, in a lateral direction and in a vertical direction by the use of guide parts.

BACKGROUND OF THE INVENTION

The background of a first group of embodiments of the invention will be explained below.

There has been already the machine tool disclosed in Japanese Patent Official Gazette No. 2968938. The machine tool is provided with a pair of right and left comparatively large side plane walls which are forwardly extended at right and left end parts of the front face of a machine bed (a base). A jig for supporting a work is provided between the side plane walls. The front lower part of the machine bed is forwardly extended to below the jig, and a chip discharging means is formed on the top face of the front lower part.

The background of second and third groups of embodiments of the invention will be explained.

The machine tool disclosed in Japanese Patent Official Gazette No. 2968938 has the following configuration in addition to the above-mentioned structure. That is, a machining head is forwardly extended from the top of the base to be arranged right above the jig.

A machine tool shown in FIG. 40 has been conventionally used. The front lower part of a base 100 is forwardly extended to reach below a jig 28 for supporting a work 'w'. A machining head 102 is forwardly extended from the top of the base 100 to be located right above the jig 28. In addition, a chip discharging means is formed on the top face of the front lower part of the base 100. Such a configuration is in accordance with the machine tool disclosed in Japanese Patent Official Gazette No. 2968938.

SUMMARY OF THE INVENTION

Problems to be Solved by the Invention

In the conventional vertical machining center or machine tool, there are some problems. For example, the pair of right and left side plane walls restrict lateral movement of the work right above the jig, thereby making it difficult to simply and rapidly move work to and from the jig, as well as to laterally move the machining head, thereby preventing the work machining range from expanding in the lateral direction. In addition, because chips of high temperature accumulate on the front lower part of the base, precision of the machining of the work is apt to be lost because of the heat of the chips. Moreover, the front lower part of the base restricts the work machining range in a vertical direction, thereby reducing flexibility in arranging the chip discharging means.

An object of the first group of embodiments of the invention is to provide a vertical machining center and a machine tool that can settle such problems.

In addition to the above-mentioned problems, in the machine tool shown in FIG. 40, the force on the tool in machining the work is transmitted through the tool T, the machining head 102, the base 100, the jig 28 and the work 'w' so as to define a loop line LP1, as shown in FIG. 40. The transmission distance of the force is comparatively long, so that the rigidity of the whole machine is reduced, and machining precision is adversely affected when the force on the tool T is large.

The applicant has already suggested in Japanese patent application No. 2005-79858, the priority of which is claimed, a machine tool that can settle such problems.

In Japanese patent application No. 2005-79858, when making the longitudinal distance between the jig and the front face of the base larger than a fixed standard, the rigidity around the base and the jig is reduced, thereby preventing precise machining. Therefore, the longitudinal distance is made smaller than the fixed standard. However, in such a case, since the size of a sluing radius around a lateral directional line of the jig, or around the work fixed on the jig, is restricted in conjunction with the fixed standard, the size of the work that can be machined by sluing is restricted in conjunction with the size of the sluing radius.

An object of the second and third groups of embodiments of the invention is achieved in view of such restrictions. The object is to provide a machine tool for easing the restriction against the size of the work in which precise machining is done, while the advantages of the machine tool described in Japanese Patent Application No. 2005-79858, the priority of which is claimed, are maintained.

Means to Solve the Problem

To achieve an object of the first group of embodiments of the invention, a machine tool is constructed as follows. The machine tool comprises a base fixed on a floor, a machining head having a vertically rotating shaft on whose bottom a tool is fixed, and a guide-driving means formed on the top face of the base to displace the machining head in a longitudinal direction, in a lateral direction and in a vertical direction through the use of guide parts, wherein the guide parts include a first saddle guided in the longitudinal direction on the top face of the base and a second saddle guided in the lateral direction on the first saddle for guiding the machining head in the vertical direction, wherein the front face of the base is formed in a single plane orthogonal to the longitudinal direction, and a jig for fixing a work machined by the tool is installed forwardly extending from a vertical intermediate position of the single plane. Here, the top face of the base is parallel to the floor, and the front face is orthogonal to the floor.

According to this invention, there are no structural members of the vertical machining center at right and left sides of the jig at the front face of the base, thereby securing a lateral range for the working area of the machining head that is comparatively wide, as well as enabling movement of the work in the lateral direction in the neighborhood right above the jig. Therefore, the work is easily and quickly carried to and from the jig.

Besides, since the chips of high temperature do not accumulate on the base, the heat of the chips is hardly transmitted to the base, thereby maintaining good machining precision for the work. Further, since the base is not under the jig, the vertical machining range of the machining head is not restricted by the base, and the flexibility for arranging a chip conveyer as a chip discharging means can be improved.

The force on the tool is transmitted through the machining head, the guide-driving means, the base, the jig and the work so as to define a loop-line L1 (see FIG. 13) while machining the work. The transmission distance of the force is comparatively short, because the jig is provided so as to forwardly extend from a vertical intermediate position of the single plane forming the front face of the base. Therefore, the rigidity of the vertical machining center against the force is increased, and the machining precision of the work can be improved. In the conventional vertical machine tool in FIG. 16, the force during machining is transmitted through a loop-line L2 illustrated in the figure, because the jig is fixed on the top face of the bed. In comparing the two loop-lines L1, L2, the loop-line L1 is shorter, because it does not pass through the bed 10a, and rigidity against the force in machining is improved. In this case, since the quantity of bending of the machine tool under the force arising in machining is in proportion to the cube of the loop-line length, rigidity is effectively increased by shortening the loop-line length. Besides, since the guide parts include the first saddle guided in the longitudinal direction on the top face of the base and the second saddle guided in the lateral direction on the first saddle for guiding the machining head in the vertical direction, wherein the first saddle is supported on both lateral ends of the top face of the base, the height of the second saddle is arranged within the vertical displaceable area of the machining head, and the second saddle is extended from the first saddle toward the front of the base to support the machining head in front of the base. According to this, besides the loop-line L1 being shortened, the rigidity of the combined structure of the base, the first saddle, the second saddle and the machining head is increased, and the precision of machining is improved.

The first group of embodiments of the invention can be constructed as follows.

That is, the whole front face of the base is formed in a single plane without any forwardly extending protrusions, or the area inside a peripheral cover for covering the front face of the base is formed in a single plane without any forwardly extending protrusions. According to this, high temperature chips are effectively prevented from accumulating on the base, thereby improving the work machining precision.

Besides, the machining head is vertically displaced in front of the single plane while the work is machined, and the work machining is done at a position lower than the guide parts of the guide-driving means. According to this, the chips from the machining head drop smoothly without reaching the guide-driving means through the front face of the base, because the guide parts include the first saddle guided in the longitudinal direction on the top face of the base and the second saddle guided in the lateral direction on the first saddle for guiding the machining head in the vertical direction, and the guide-driving means stably keeps working well without being obstructed by the chips.

Moreover, the top face of the base is about 1.0 m-1.5 m above the floor. According to this, an adult worker can move the work onto the jig manually in a standing position, because the guide parts include the first saddle guided in the longitudinal direction on the top face of the base and the second saddle guided in the lateral direction on the first saddle for guiding the machining head in the vertical direction, and maintain the guide-driving means on the base without bending.

Furthermore, a groove is formed in the bottom face of the base, and a chip conveyer for discharging the chips from the front lower part of the base to the rear thereof is arranged therein. According to this, since the chip conveyer can be arranged along the longitudinal direction in the groove in the bottom face of the base, the chip conveyer can be provided at a lower position such that heat is hard to be transmitted by chips being carried out rearward through the base. In addition, since the chip conveyer mounted in the longitudinal direction in the groove has the chip entrance arranged right below the jig and the chip exit arranged at a place suitable for exhausting the chips, the direction for transmitting the chips can be decided in accordance with the situation at the scene. For example, the direction can be in the lateral direction instead. Accordingly, flexibility for installing the chip conveyer is improved.

Furthermore, the chip conveyer arranged in the groove is installed on the floor, and the chip entrance of the conveyer is arranged under the jig. According to this, in carrying out the chips rearward through the base, the height of the jig can be lowered without being affected by the base, and the heat of the chips is hard to be transmitted to the base.

Moreover, many screw holes are arranged in a row in the vertical direction on the front face of the base, and the fixed height of the jig is in a position corresponding to the screw holes in which screw members for fixing the jig are screwed. According to this, in connection with the front face of the base being formed in a single plane, the jig can be stably fixed by simple means such as the screw member and the screw hole. In addition, the fixed height can be suitably changed within the comparatively broad area of the front face of the base.

Furthermore, a pair of vertical long board members are fixed at the left and right of the front face of the base as a part of the jig, and the rest of the jig is fixed on the front face of the board members. Accordingly, the forward extending length of the jig from the front base can be changed in accordance with the thickness of the board members. Therefore, the machining area can be freely changed even for the same work, and space due to the thickness of the board members is formed between the jig and the base.

To achieve an object of the second group of embodiments of the invention, a machine tool of the present invention is formed as follows. That is, the machine tool comprises a base fixed on a floor, a machining head having a vertically rotating shaft on whose bottom a tool is fixed, and a guide-driving means formed on the top face of the base to displace the machining head in a longitudinal direction, in a lateral direction and in a vertical direction through guide parts, wherein almost the whole front face of the base is formed in a single plane orthogonal to the longitudinal direction, a laterally intermediate front part of the base forming an area between a pair of right and left lateral end front parts of the base having the vertical overall length portions, or the vertical roughly overall length portions, at right and left end parts of the front face is formed to be detachable from the other portions of the base, and a jig for fixing a work machined by the tool is installed forwardly extending from a vertical intermediate position of the front face. Here, the top face of the base is parallel to the floor, and the front face is perpendicular to the floor.

According to the second group of embodiments of the invention, there are no members of the structure of the vertical machining center that are on the jig on the front face of the base and to the right and left of the work fixed to the jig, thereby providing a lateral range for machining by the machining head that is comparatively wide, as well as providing a lateral range for moving the work in the lateral direction in the neighborhood right above the jig that is comparatively wide. Therefore, the work is easily and quickly carried to and from the jig.

Besides, since the chips of high temperature do not accumulate on the base, the heat of the chips is hard to be transmitted to the base, thereby keeping the machining precision of the work good. Further, since the base is not under the jig, the vertical machining area for the machining head is not restricted by the base, thereby improving the flexibility for installing a chip conveyer as a chip discharging means.

Moreover, the force on the tool is transmitted through the machining head, the guide-driving means, the base, the jig and the work in a loop-line during machining. The transmission distance of the force is comparatively short, because the jig is provided so as to forwardly extend from the vertical intermediate position of the single plane forming the front face of the base. Therefore, the rigidity of the vertical machining center against the force is increased, thereby improving the machining precision of the work.

Furthermore, since a recess is formed in the front face by separating and removing a laterally intermediate front part from the rest of the base, the sluing radius of the jig or the work fixed thereon is increased in relation to the lateral dimension of the front of the base. In this case, the lateral end front parts of the base include the vertical overall length portions, or the vertical roughly overall length portions, at the right and left end parts of the front face of the base, and the lateral length and the longitudinal length are formed in specified sizes related to the rigidity, respectively. Therefore, the sluing of the jig or the work fixed thereon is improved without extending the transmission distance of the force during machining, and without decreasing the rigidity of the base relative to the rigidity of the base in Japanese patent application No. 2005-79858. The upper limit for the size of a work on which precise machining can be performed is effectively eased.

The jig can be fixed on the front face of the laterally intermediate front part of the base in the state in which the previously separated and removed front part is installed in its original position, so that it can function like that of Japanese patent application No. 2005-79858.

To achieve an object of the third group of embodiments of the invention, a machine tool of the present invention is formed as follows. That is, the machine tool comprises a base fixed on a floor, a machining head having a vertically rotating shaft on whose bottom part a tool is fixed, and a guide-driving means formed on the top face of the base to displace the machining head in a longitudinal direction, in a lateral direction and in a vertical direction through guide parts, wherein the guide parts include the first saddle guided in the longitudinal direction on the top face of the base and the second saddle guided in the lateral direction on the first saddle and guiding the machining head in the vertical direction. In addition, almost the whole front face of the base is formed in a single plane orthogonal to the longitudinal direction, the laterally intermediate front part of the base forming an area between a pair of right and left lateral end front parts of the base having the vertical overall length portions, or the vertical roughly overall length portions, at right and left end parts of the front face is excised, and a jig for fixing a work to be machined by the tool is installed forwardly extending from a vertical intermediate position of the front face. Here, the top face of the base is parallel to the floor, and the front face is perpendicular to the floor.

According to the third group of embodiments of the invention, the machine tool has the same form as one in which the laterally intermediate front part of the base is taken away from the machine tool in connection with the second group of embodiments of the invention, and therefore, the same effect as in the second group of embodiments of the invention can be obtained. Besides, similarly with the case of the first group of embodiments of the invention, since the guide-driving means is provided with the first saddle guided in the longitudinal direction on the top face of the base and the second saddle guided in the lateral direction on the first saddle and guiding the machining head in the vertical direction, the first saddle is supported at both lateral ends of the top face of the base, the height of the second saddle stays within the area where the machining head is vertically displaced, and the second saddle supports the machining head in the front area of the base, the second saddle extending from the first saddle to the front of the base. According to this, the length of the loop line L1 is shortened, and besides, the rigidity of the structure uniting the base, the first saddle, the second saddle and the machining head is increased, and thereby, machining precision is increased. To achieve the aim of the third group of embodiments of the invention, another machine tool is modified as follows. That is, the machine tool comprises a base fixed on a floor, a machining head having a vertically rotating shaft on whose bottom part a tool is fixed, and a guide-driving means formed on the top face of the base to displace the machining head in a longitudinal direction, in a lateral direction and in a vertical direction through guide parts, wherein almost the whole front face of the base is formed in a single plane orthogonal to the longitudinal direction, and thereafter, a portion of the front face inside a peripheral cover for covering the front face is determined, a pair of right and left lateral end front parts of the base comprising the vertical overall length portion at right and left end parts of the area is determined, the vertical overall length portion of the lateral intermediate front part of the base of the position between the pair of right and left lateral end front parts of the base is determined, and thereafter, the vertical overall length portion is excised. In addition, a jig for fixing a work to be machined by the tool is installed forwardly extending from a vertical intermediate position of the front face. Here, the top face of the base is parallel to the floor, and the front face is perpendicular to the floor. According to the modified third group of embodiments of the invention, the machine tool has the same form as one in which the laterally intermediate front part of the base is taken away from the machine tool in accordance with the second group of embodiments of the invention, and therefore, the same effect as the second group of embodiments of the invention can be obtained. Besides, since the base is formed by determining the vertical overall portion of the laterally intermediate front part of the base, and thereafter excising it along the single plane, a recess is formed between the pair of right and left lateral end front parts in the portion covered with the peripheral cover of the front face of the base, and a face of the recess parallel to the lateral direction is formed in an orthogonal plane parallel to the single plane. Accordingly, during machining, heated cutting chips do not accumulate on the base, whether the coolant is mist or not, and the heat of the cutting chips is hard to transmit to the base. Therefore, the work machining precision remains good.

The second group of embodiments of the invention and the third group of embodiments of the invention can be constructed as follows. That is, the longitudinal length of the lateral end front part of the base is made about 100 mm-300 mm. According to this, the sluing radius around the lateral line of the jig and the work fixed thereon is made larger by about 100 mm-300 mm without diminishing the rigidity of the base, whose longitudinal, lateral and vertical lengths are made 5 m-6 m. The work sluing radius around the lateral line of the work, which makes the precise work machining possible, is made larger by about 100 mm-300 mm.

The lateral length of the right and left lateral end front parts of the base is made more than 100 mm. According to this, the sluing radius around the lateral line of the jig and the work fixed thereon is made larger in relation to the longitudinal length of the lateral end front parts of the base without diminishing the rigidity of the base whose longitudinal, lateral and vertical lengths are made 5 m-6 m.

Besides, the jig is formed so as to be forwardly extended from the front faces of the pair of right and left lateral end front parts of the base. According to this, since the recess made by removing the laterally intermediate front part of the base in the second group of embodiments of the invention is provided on the front face of the base, the sluing radius of the jig and the work fixed thereon is increased in relation to the longitudinal length of the lateral end front parts of the base. In this case, since the lateral end front part of the base includes the vertical overall length portions, or the vertical roughly overall length portions, at the right and left end parts of the front face of the base, and the lateral length and the longitudinal length can give the rigidity necessary for the base, the sluing radius of the jig and the work fixed thereon is increased without extending the transmitting distance of the force of machining in comparison with that of Japanese patent application No. 2005-79858, and the rigidity of the base is hardly reduced. Therefore, the limitation in the size of the work that can be precisely machined is relieved.

Moreover, the jig is formed so as to be forwardly extended from the front of the laterally intermediate front part of the base. According to this, the jig is supported by the laterally intermediate front part of the base without going through the lateral end front parts of the base. Therefore, the work can be supported by the jig, whose lateral length is comparatively short. Accordingly, the transmission distance of the force of machining is made small to diminish distortion of the jig and the base due to external force during machining as much as possible, whereby precise machining results.

Furthermore, the jig is arranged between the pair of right and left lateral end front parts of the base rearward of the front face. According to this, the machined range of the work fixed on the jig is arranged near and in front of the single plane. Therefore, the transmission distance of the force during machining is made smaller to diminish distortion of the jig and the base due to external force during machining as much as possible, thereby enhancing precise machining.

Effect of Invention

The machine tool of the invention improves machining precision of work by increasing the rigidity of the whole of the machining head, the second saddle, the first saddle, the base and the jig, as well as by shortening the length of the loop-line through which the force on the tool is transmitted through the machining head, the guide-driving means, the base, the jig and the work while machining the work. Besides, the machining precision of the work is improved by preventing the cutting chips from accumulating on the base, whether or not the coolant for the portion of the work being machined is mist, so that the heat of the cutting chips is not transmitted to the base.

BRIEF DESCRIPTION OF THE DRAWINGS

FIG. 13 is a side view showing a transmission course of the force produced during machining in the first embodiment.

FIG. 14 shows a state that six vertical machining centers are displayed aside. FIG. 14A is a plan view and FIG. 14B is a side view.

FIG. 15 shows another state that six vertical machining centers are displayed aside.

FIG. 38 shows the state that six vertical machining centers are displayed aside.

FIG. 39 shows another state that six vertical machining centers are displayed aside. FIG. 39A is a plan view and FIG. 39B is a partially schematic side view.

PREFERRED EMBODIMENT OF THE INVENTION

A first group of embodiments of the present invention will be described as follows.

Figure 1:
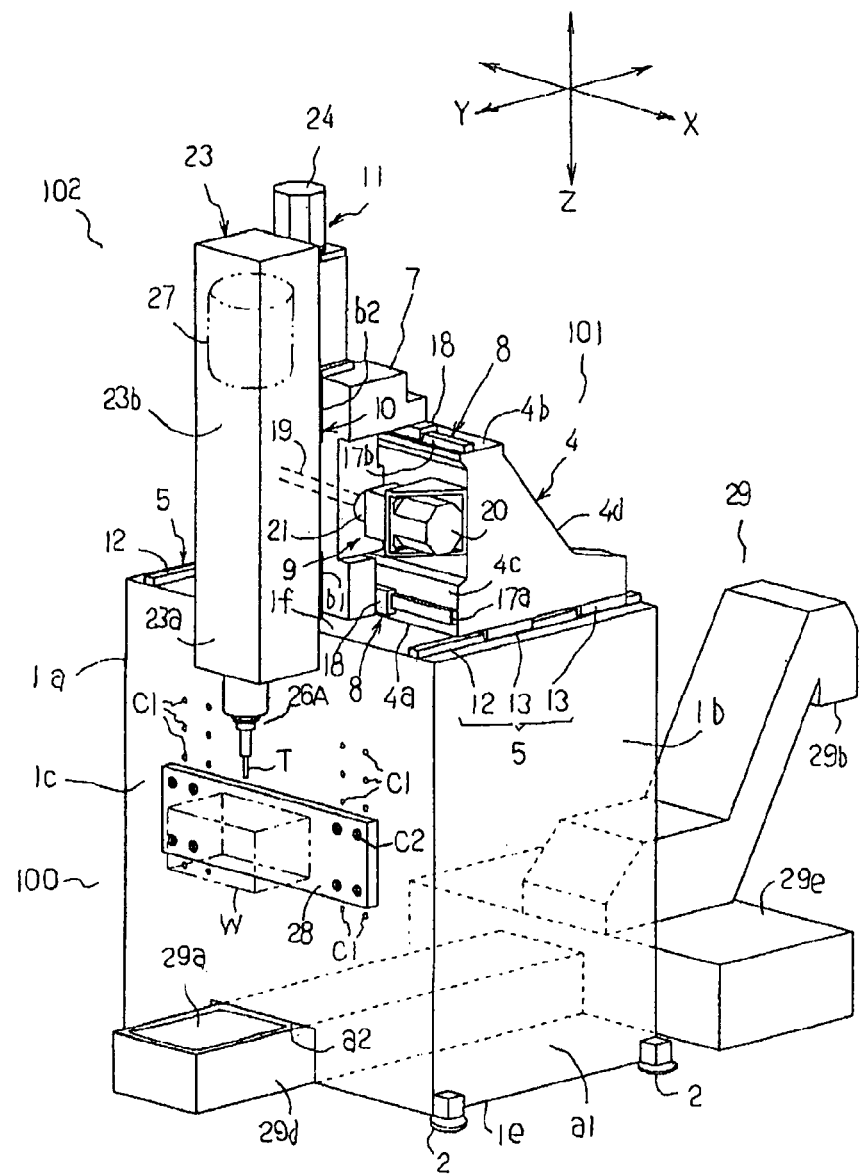
FIG. 1 is a partially schematic perspective view of a vertical machining center of a first embodiment of the present invention.
Figure 2:
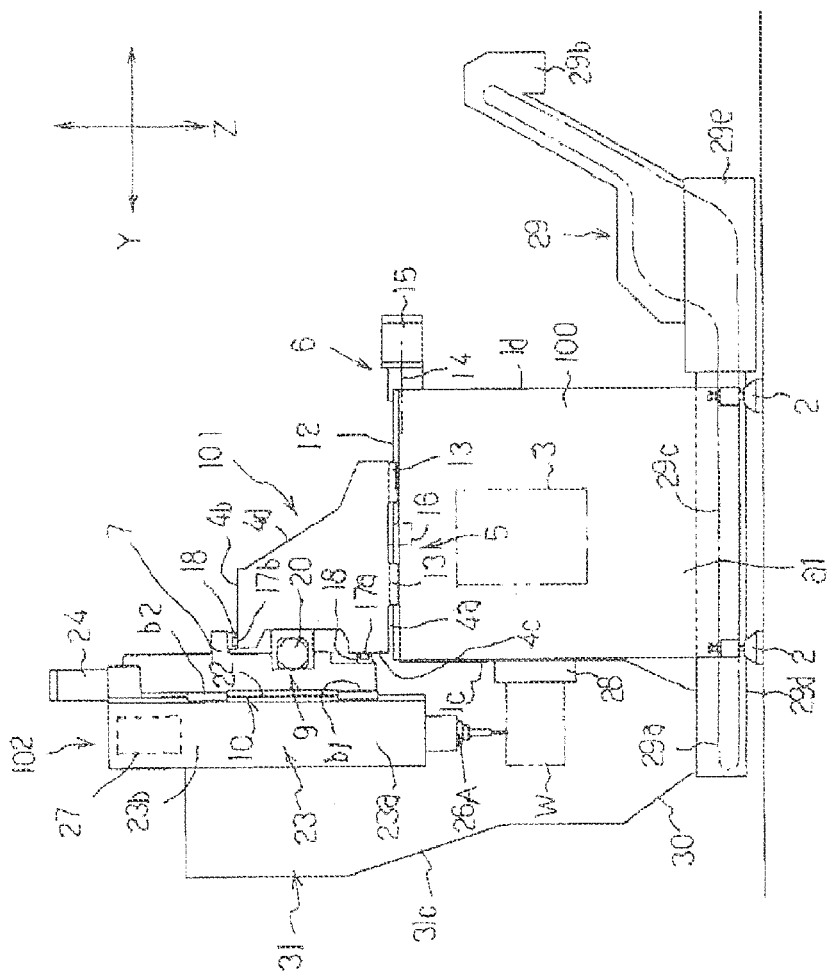
FIG. 2 is a side view of the vertical machining center of FIG. 1.
Figure 3:
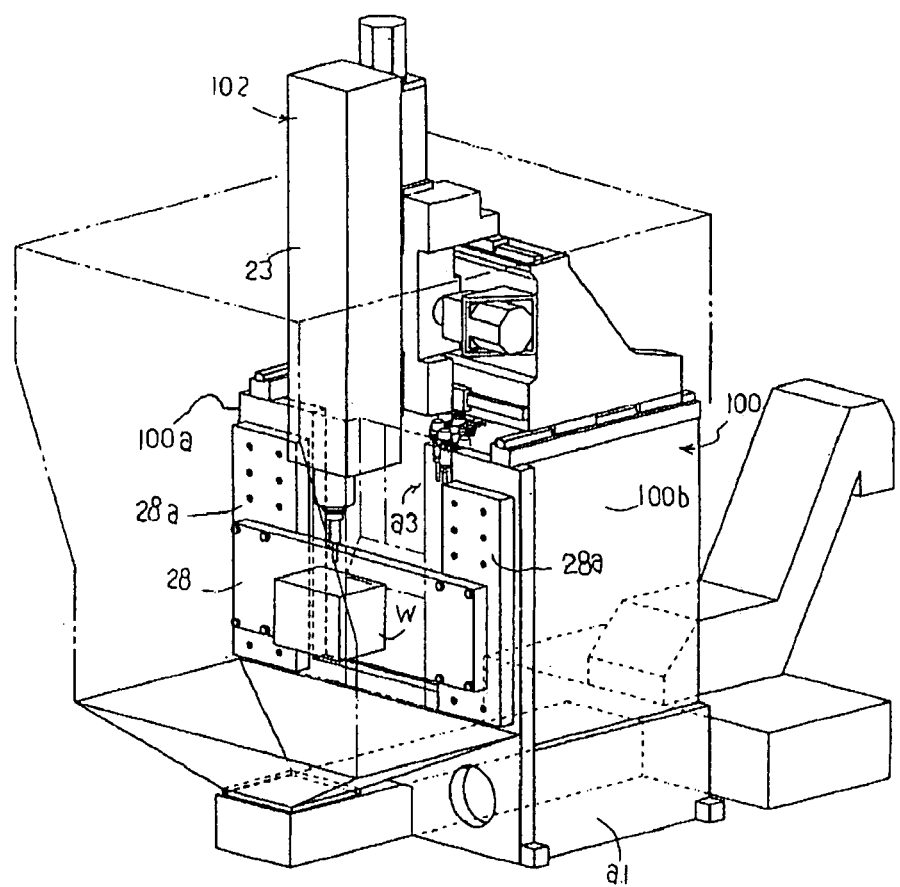
FIG. 3 is a perspective view of a vertical machining center of a second embodiment of the present invention, wherein the base and the jig of the first embodiment are modified.
Figure 4:
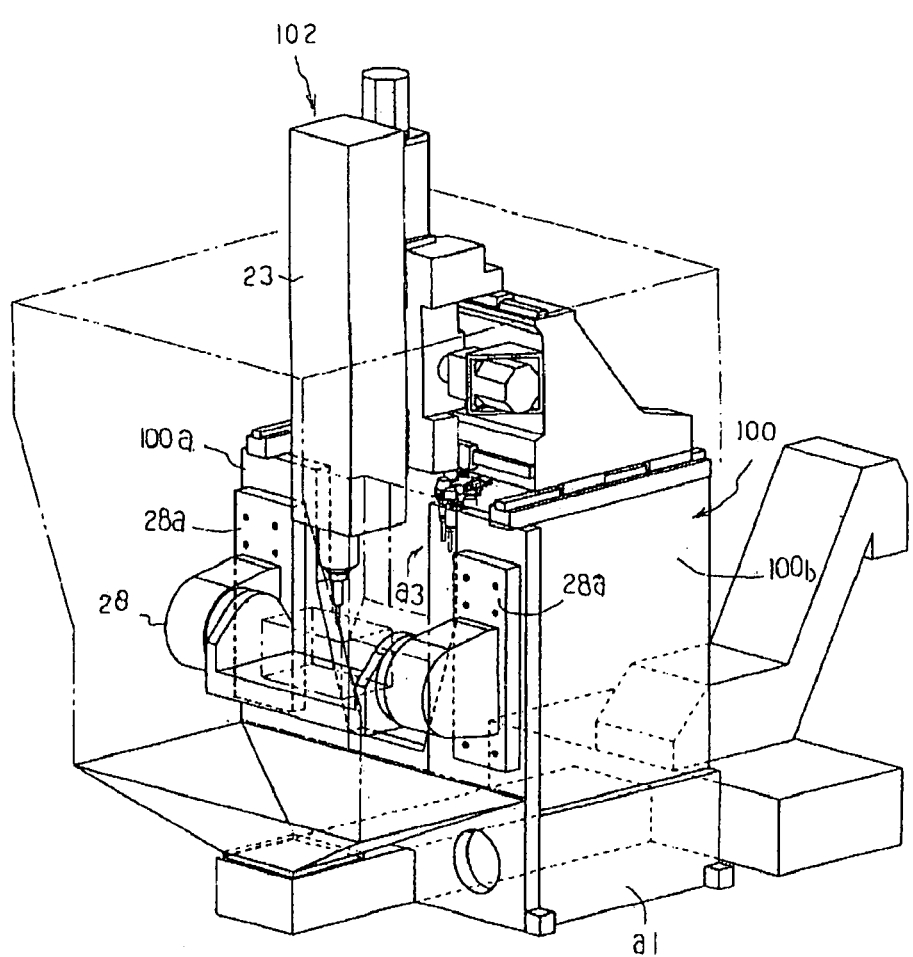
FIG. 4 is a perspective view of a vertical machining center of a third embodiment of the present invention, wherein the base and the jig of the second embodiment are modified.
Figure 5:
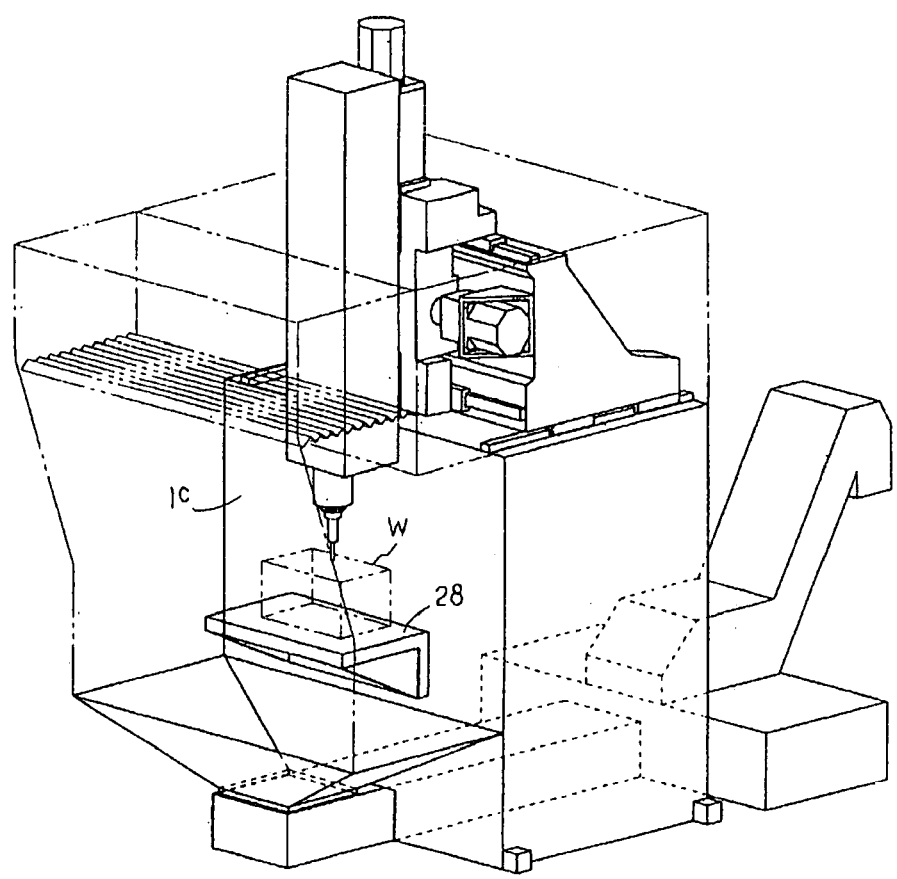
FIG. 5 is a perspective view of a machining center of a fourth embodiment of the present invention, wherein the jig and other elements of the first embodiment are modified.
Figure 6:
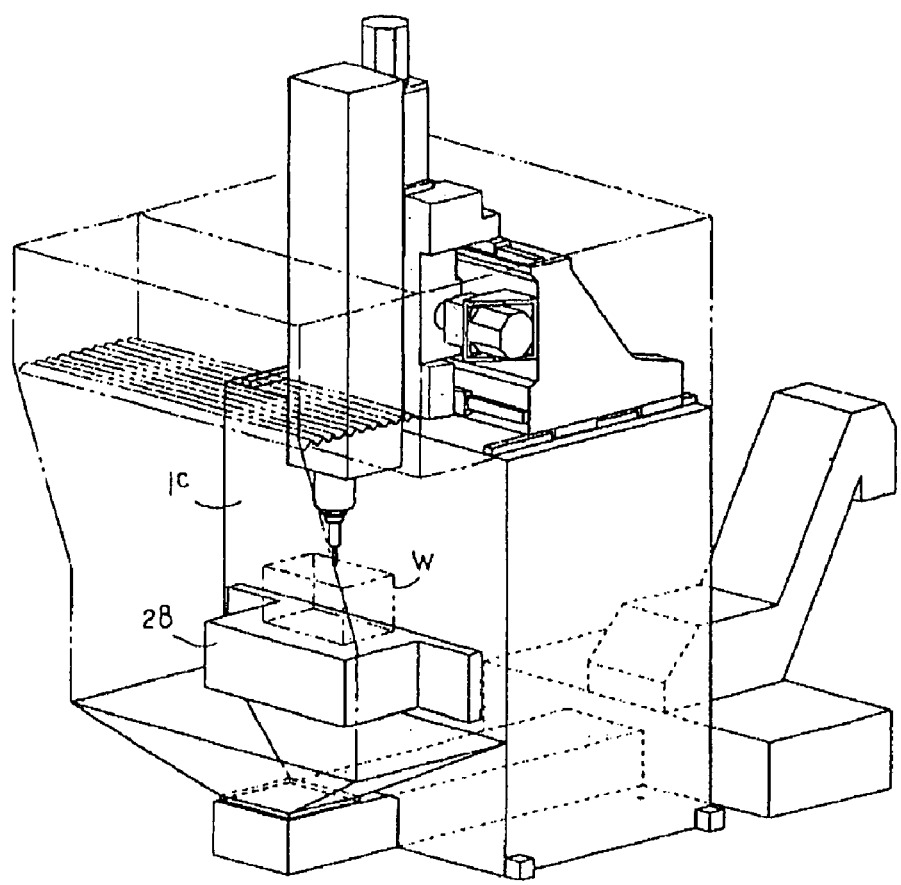
FIG. 6 is a perspective view of a machining center of a fifth embodiment of the present invention, wherein the jig and other elements of the first embodiment are modified.
Figure 7:
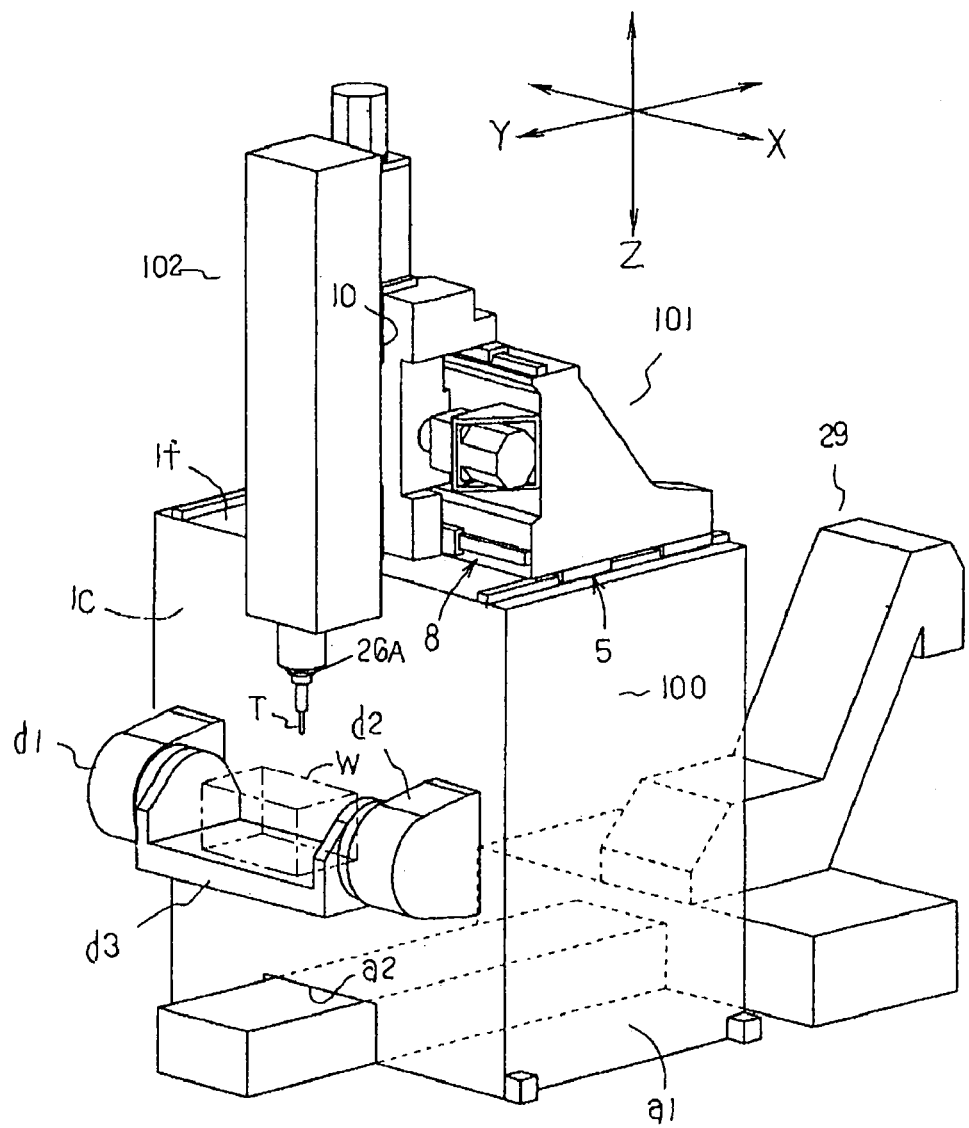
FIG. 7 is a partially schematic perspective view of the vertical machining center of FIG. 4.
Figure 8:
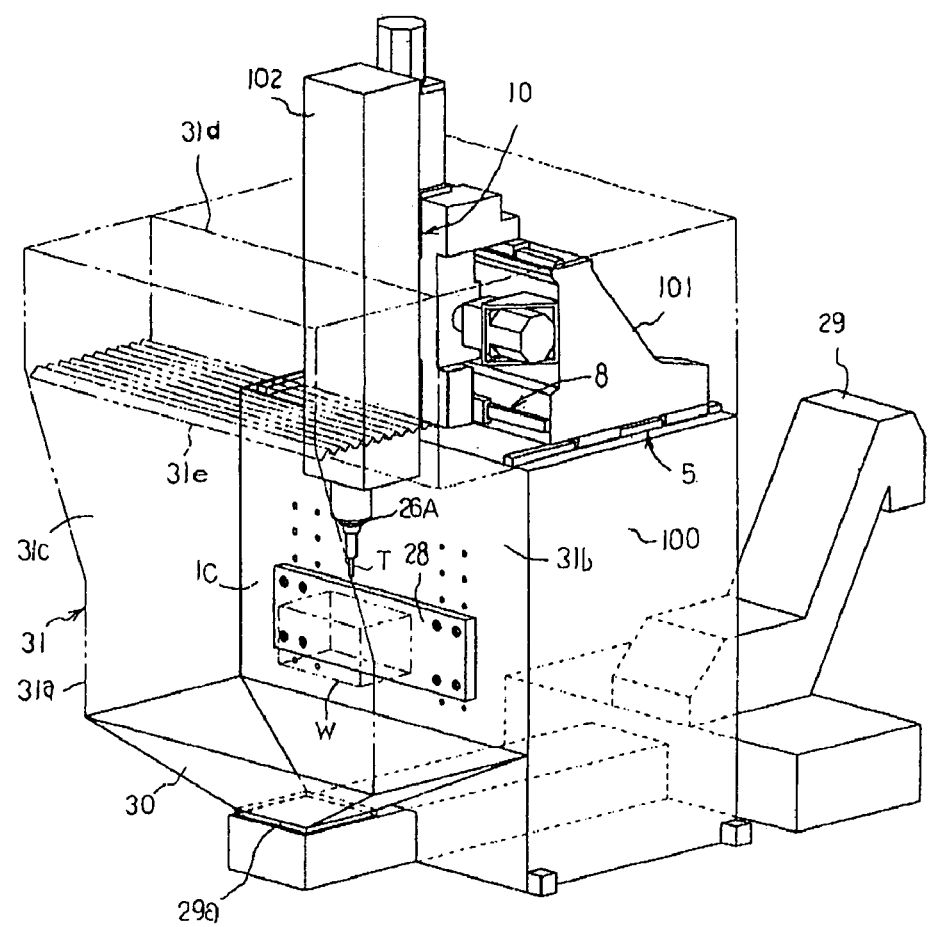
FIG. 8 is a perspective view of the vertical machining center of FIG. 1.
Figure 9:
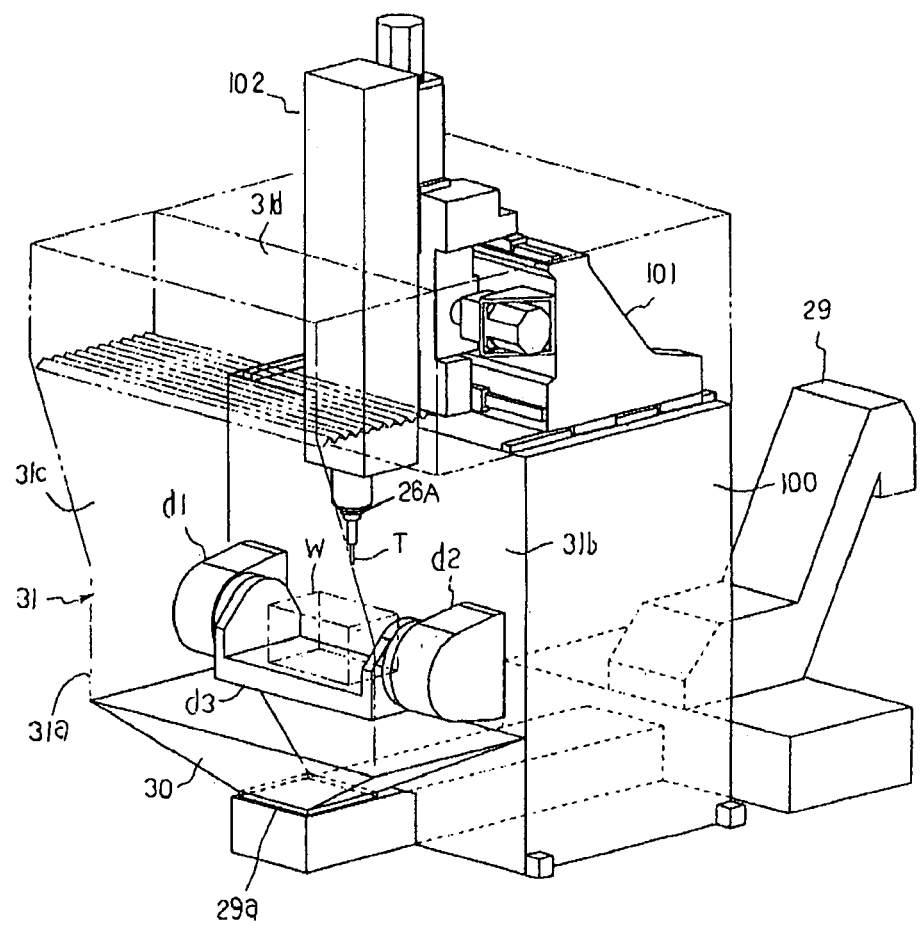
FIG. 9 is a perspective view of the vertical machining center of the third embodiment.
Figure 10:
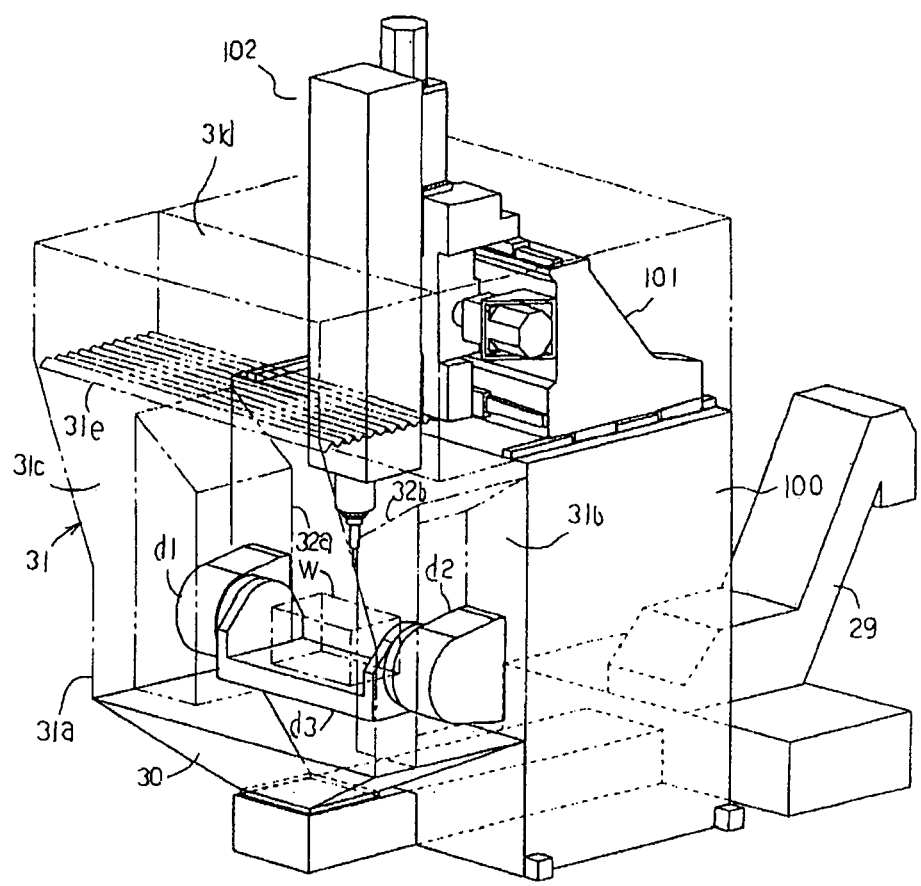
FIG. 10 is a perspective view showing a modification of the vertical machining center of the third embodiment.
Figure 11:
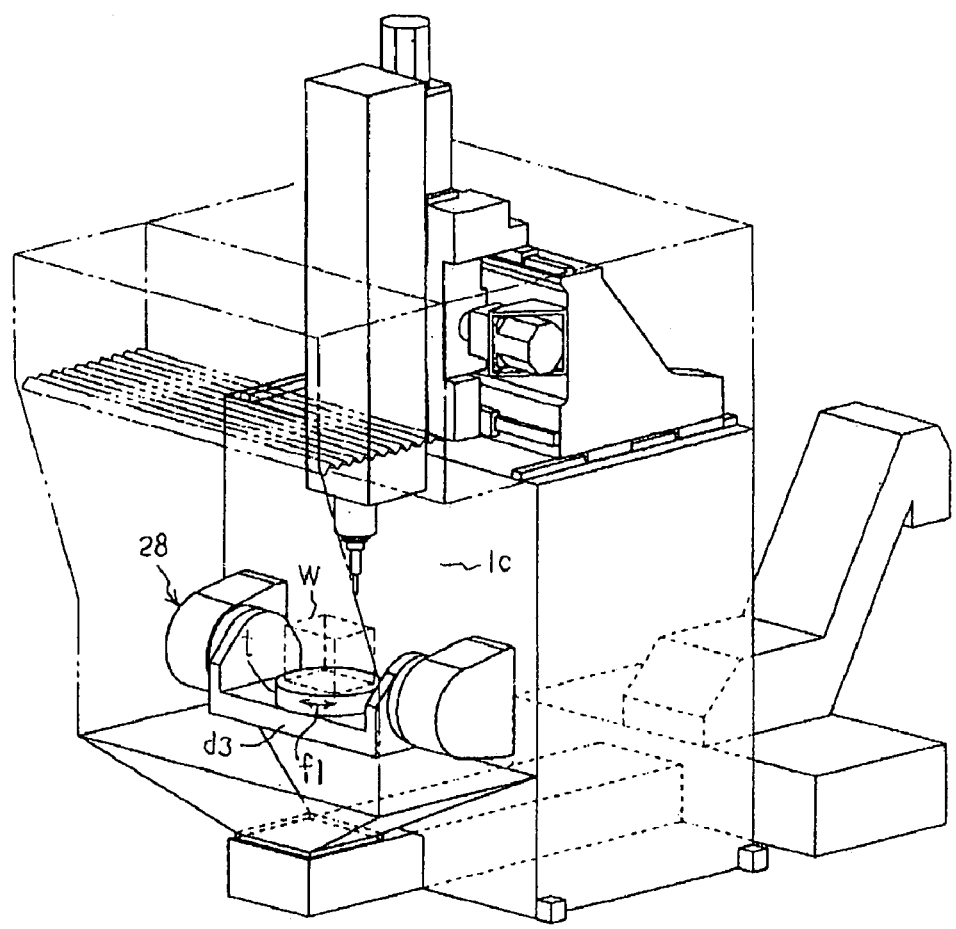
FIG. 11 is a perspective view of a vertical machining center wherein a table is provided to the jig of the third embodiment.
Figure 12:
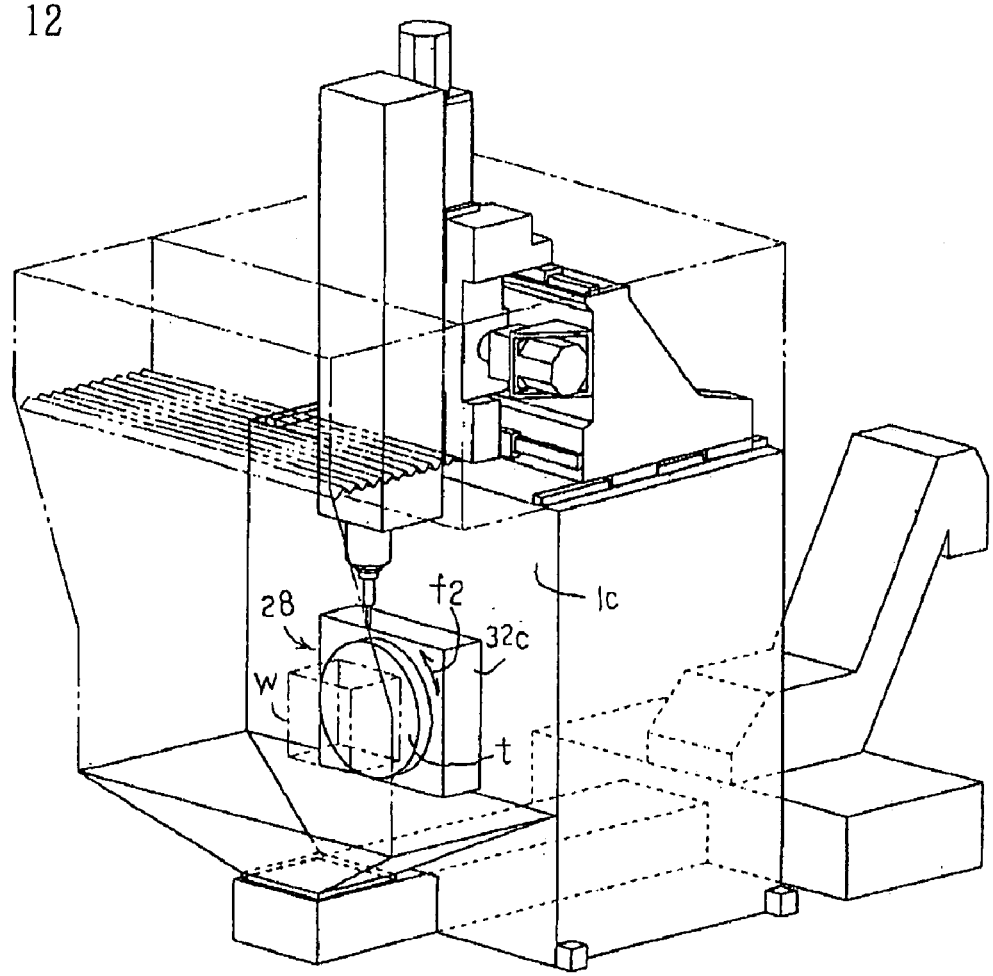
FIG. 12 is a perspective view of a vertical machining center wherein a table of a jig is provided to the front face of the base of the first embodiment.

FIG. 1 to FIG. 13 show a vertical machining center of a machine tool related to the first group of embodiments. FIG. 1 is a partially schematic perspective view of a vertical machining center of a first embodiment; FIG. 2 is a side view of the vertical machining center of the first embodiment; and FIG. 3 is a perspective view of a second embodiment of a vertical machining center of the present invention in which a base and a jig of the first embodiment are modified. FIG. 4 is a perspective view of a third embodiment of a vertical machining center of the present invention, wherein a base and a jig of the second embodiment are modified. FIG. 5 and FIG. 6 are perspective views of fourth and fifth embodiments of a machining center according to the present invention, wherein the jig and other elements of the first embodiment are modified. FIG. 7 is a partially schematic perspective view of the vertical machining center of the third embodiment. FIG. 8 is a perspective view of the vertical machining center of the first embodiment; FIG. 9 is a perspective view of the vertical machining center of the third embodiment; and FIG. 10 is a perspective view showing a modification of the vertical machining center of the third embodiment. FIG. 11 is a perspective view of a vertical machining center in which a table is provided for the jig of the third embodiment; and FIG. 12 is a perspective view of a vertical machining center wherein a table of a jig is provided on the front face of the base of the first embodiment. FIG. 13 is a side view showing the transmission course of the force produced during machining in the first embodiment.

As shown in FIG. 1 and FIG. 2, the vertical machining center of the invention comprises a base 100, a guide-driving means 101 and a machining head 102.

The base 100 is stationed on a floor, the base being formed as an almost rectangular solid in which each of right and left side faces 1a, 1b is formed in a single plane orthogonal to a lateral direction (an X-axial direction) and a front face 1c and the greater part of a rear face 1d are respectively single planes orthogonal to a longitudinal direction (a Y-axial direction).

A bed a1 is the lower part of the base 100, the bed facing the floor. Supporting members 2 are adjustable in the height, and are provided near the four corners of the bottom face 1e of the bed 1a. In addition, a groove a2 extending in the Y-axis direction is formed in the bottom face 1e. The base 100 is box shaped, and a tool exchanger 3 (FIG. 2) is installed in the upper inside thereof.

The top face, the front face and the rear face of the base 100 can be opened by providing a left part 100a and a right part 100b on the bed a1, as shown in FIG. 3 and FIG. 4.

The guide-driving means 101 comprises the first saddle 4, the first guide part 5, the first drive part 6, the second saddle 7, the second guide part 8, the second drive part 9, the third guide part 10 and the third drive part 11.

Structurally, the first saddle 4 is a roughly trapezoidal block as viewed from a side, disposed on the top face 1f of the base 100. The bottom face 4a and the top face 4b are horizontal, the front face 4c is a plane orthogonal to the Y-axis direction, and the rear face 4d is inclined downwardly and rearwardly. The center vertically of the front face 4c is concave when viewed from a side.

The first guide part 5 comprises a pair of guide rails 12 provided on the right and left sides of the top face of the base 100 in a fixed manner and guide blocks 13 provided at front and back positions on the right and left sides of the bottom face 4a of the first saddle 4. Here, the guide rails 12 are straight along the Y-axis direction, and the guide blocks 13 are free-slidably fitted on the guide rails 12.

As can be seen in FIG. 2, the first drive part 6 comprises the first screw shaft 14, the first servo motor 15 for rotatably driving the first screw shaft 14, and a nut body 16 in which the first screw shaft 14 is screwed. The first screw shaft 14 is arranged at the center in the X-axis direction between the top face 1f of the base 100 and the bottom face 4a of the first saddle 4 in the Y-axis-direction and rotatably held at the specified position of the top face if through a bearing. The nut body 16 is fixed on the bottom face of the first saddle 4. The servo motor 15 is rotated by a not-illustrated numerically controlled control device (NC control device) to move the first saddle 4 along the Y-axis direction on the base 100.

The second saddle 7 is a vertical, roughly rectangular block, extending nearly to the front face of the first saddle 4, comprising a top part, a bottom part and a central part. The central part connects the top part and the bottom part. The right and left ends of the top part and the bottom part are extended slightly from the central part to the right and left sides, and the top part is extended rearward from the central part and the bottom part.

The second guide part 8 comprises a lower guide rail 17a, an upper guide rail 17b and a pair of right and left guide blocks 18. The lower guide rail 17a is straight along the X-axis direction, fixedly provided on the lower portion of the front face 4c of the first saddle 4. The upper guide rail 17b is straight along the X-axis direction, fixedly provided on the front part of the top face 4b of the first saddle 4. The guide blocks 18 are free-slidably fitted on the guide rails 17a, 17b, respectively.

As can be seen in FIG. 1, the second drive part 9 comprises the second screw shaft 19, the second servo motor 20 for rotatably driving the second screw shaft 19 and a nut body 21 in which the second screw shaft 19 is screwed. The second screw shaft 19 is arranged at the center in the Z-axis direction between the front face 4c of the first saddle 4 and the rear face of second saddle 7 in the Y-axis direction, rotatably held at a specific position of the front face 4c of the first saddle 4 through the bearing. The nut body 21 is fixed on the rear face of the second saddle 7. The second servo motor 20 is rotated by the not-illustrated NC control device to move the second saddle 7 along the X-axis direction on the front face 4c of the first saddle 4.

As can be seen in FIG. 2, the third guide part 10 comprises a pair of guide rails 22 and guide blocks b1, b2. The guide rails 22 are straight along the Z-axis direction, fixedly provided on right and left sides of a rear face of a head main body 23 comprising an upper head main body 23b and a lower head main body 23a. The guide blocks b1, b2 are fixedly provided on upper and lower positions of right and left sides of the front face of the second saddle 7, and are free-slidably fitted on the corresponding guide rails.

The third drive part 11 comprises a not-illustrated third screw shaft, the third servo motor 24 for rotatably driving the third screw shaft, and a not-illustrated nut body in which the third screw shaft is screwed. The third screw shaft is arranged at the center in the X-axis direction between the front face of the second saddle 7 and the rear face of the upper head main body part 23b in the Y-axis direction, rotatably held at a specific position of the front face of the second saddle 7 through the bearing. The nut body is fixed on the rear face of the upper head main body 23b. The third servo motor 24 is rotated by the not-illustrated NC control device to move the machining head 102 along the Z-axis direction on the front face of the second saddle 7.

The machining head 102 comprises the head main body 23, a vertical rotation driving shaft 26A and a spindle motor 27 for rotating the driving shaft 26A. The driving shaft 26A is rotatably supported on the head main body 23 through the bearing, fixedly having the tool T on the lower end. The spindle motor 27 is fixed to the upper head main body 23b.

In the above-mentioned configuration, a jig 28 is provided on the front face 1c of the base 100 to support a work 'w' fixedly. The jig 28 is a plane board so as to fixedly support the work 'w' through a screw member and so on. A means for optionally changing the height of the jig 28 is formed in a central position in the X-axis direction of the base 100. Structurally, many screw holes c1 are arranged in a row along the Z-axis direction on the front face 1c of the base 100, and the jig 28 is changed to the height corresponding to the screw holes c1 by changing the screw holes c1 in which screw members c2 for fixing the jig 28 are screwed. Alternatively, the jig 28 can be an angled board as shown in FIG. 5 or a rectangular block as shown in FIG. 6.

In the embodiments of FIGS. 3 and 4, it is expected that a board member 28a for fixing the jig 28 on the front face of the base as shown in FIG. 3 and FIG. 4 and a convex-shaped or concave-shaped guide rail for guiding the jig 28 along the Z-axis direction are provided on the front face 1c. Here, the board member 28a forms a part of the jig 28. Furthermore, forming a recess a3 in a part of the front face 1c as shown FIG. 3 and FIG. 4 does not deviate from the configuration of the invention, namely, the front face 1c is formed in a single plane.

The jig 28 can be formed so as to support a work supporting part that is adjustable for changing position through the NC control device. For example, as shown in FIG. 7, a simple bearing d2 and a bearing part d1 in which a driving device is built are fixedly provided extending forwardly from right and left portions of the front face 1c of the base 100, and a work supporting part d3 is provided between the bearings d1, d2 through a rotation supporting shaft along the X-axis direction. The position around the rotation supporting shaft of the work supporting part d3 may be changed by an order of the NC control device. Instead of this, it may be that right and left inclined postures of the work 'w' fixed on the work supporting part are changed according to an order of the NC control device or the work 'w' fixed on the work supporting part is changed around a specific shaft along the Z-axis direction according to an order of the NC control device. Such a jig 28 can be formed so that the height is adjustable, if necessary. For example, the jig 28 can be formed so as to move in the Z-axis direction in response to the rotation of the servo motor. Furthermore, a mechanism for rotary displacement of the work or vertical displacement of the work may be operated by a manual handle or a cylinder drive operated by oil pressure or air pressure.

A chip conveyer 29 for carrying chips to a specific place is provided under the base 100. The chips are produced when the work 'w' fixed on the jig 28 is cut. The chip conveyer 29 comprises a chip entrance 29a and a chip exit 29b. The chip entrance 29a is arranged right under the jig 28, and the chip exit 29b is arranged at a place suitable for carrying out the chips. The direction that the chip conveyer 29 carries out the chips is suitably decided in response to the on-site situation, sometimes extending in the Y-axis direction, as illustrated, or the X-axis direction. The chip conveyer 29 is provided with an endless carrying belt 29c that moves the chips received on its top face. Circumference of the endless carrying belt 29c is surrounded by a fluid-tight casing 29d. The inside of the casing 29d is used as a passage for coolant, and a tank 29e for storing the coolant is formed at a longitudinal position of the casing 29d.

In the vertical machining center shown in FIG. 1 and FIG. 2, generally as shown in FIG. 8, a hopper part 30 is formed on the front face 1c of the base 100, below the jig 28. The hopper part 30 receives chips and coolant and drops them into the chip entrance 29a through a bottom opening. The chips are produced when the work 'w' fixed on the jig 28 is cut, and the coolant is fed into the cut portion of the work 'w'. A peripheral cover 31 is provided to surround a space in front of the base 100, above the hopper part 30, and an upper space of the base 100. The peripheral cover 31 shown in FIG. 8 and FIG. 9 comprises right and left side plane walls 31a, 31b, a front plane wall 31c, a vertical plane wall 31d fixed on the machining head 102 and extending in the X-axis direction, and an accordion-shaped horizontal wall 31e connecting the lower end edge of the vertical plane wall 31d and the upper inside of the front plane wall 31c. Here, the accordion-shaped horizontal wall 31e is extensively deformed along the Y-axis direction. In this case, right and left end edges of the horizontal wall 31e are in close contact with the insides of the right and left side plane walls 31a, 31b, respectively. Switching ports for moving the work 'w' into or out of the circumferential cover 31 are formed in the front plane wall 31c and the right and left side plane walls 31a, 31b, if necessary.

As shown in FIG. 10, inside covers 32a, 32b for surrounding the bearing parts d1, d2 are provided in the peripheral cover 31, if necessary. The inside covers 32a, 32b contribute towards preventing the chips from entering between relative sliding faces of the bearing parts d1, d2, as well as preventing the coolant from splashing and adhering on the circumference of the bearing parts d1, d2. As shown in FIG. 11, a table 't' rotating toward an arrow direction f1 can be provided on the work supporting part d3, or as shown in FIG. 12, the table 't' rotating toward an arrow direction f2 can be provided on the front face 1c of the base 100. However, in this case, an inside cover 32c for surrounding a driving device of the table 't' is provided in the peripheral cover 31 to fluid-tightly separate the work machining area and the driving device for the table 't'. According to this, the driving device for the table 't' is protected from the coolant and the chips.

A use example and an operation I which the work 'w' is machined by the vertical machining center shown in FIG. 8 to FIG. 10 will be explained below.

An operator carries the work 'w' outside the peripheral cover 31 and fixes it on the work supporting part of the jig 28. After machining the work 'w', the operator removes the work 'w' from the jig 28 and moves it out of the circumferential cover 31. In this case, since the front face 1c of the base 100 is formed in a single plane and the jig 28 is provided at a vertically intermediate position of the single plane, there are no component members of the vertical machining center on the front side and the right and left sides of the jig 28 inside the peripheral cover 31. Therefore, the work 'w' is comparatively easily transported to the jig 28 by being displaced from the front side of the jig 28 in the Y-axis direction through a switching entrance of the front plane wall 31c from the outside of the peripheral cover 31, or by being displaced from the right and left sides of the jig 28 in the X-axis direction through the switching entrances of the right and left side plane walls 31a, 31b. Furthermore, the work 'w' is comparatively easily transmitted outside the peripheral cover 31 by being displaced from the jig 28 in the Y-axis direction through the switching entrance of the front plane wall 31c, or by being displaced in the X-axis direction through the switching entrances of the right and left side plane walls 31a, 31b. Moreover, in each of the examples of FIG. 17 to FIG. 22, a configuration in which the front face 1c of the base 100 is formed in a single plane, and the jig 28 is provided at a vertically intermediate position of the single plane, contributes effectually towards making the length of the work 'w' fixed on the jig 28 in the X-axis direction comparatively large.

When a machining area for the tool T needs to be changed because the size of the work 'w' is changed, in the vertical machining center shown in FIG. 8, the height of the jig 28 is changed by changing the screw hole c1 in which the screw member c2 is screwed. In this case, when the height of the jig 28 above the floor is diminished, a Z-axial distance from the jig 28 to the tool T of the machining head at the initial position is increased, and therefore, the height of the machining area is increased. Conversely, when the height of the jig 28 is increased, the Z-axial distance from the jig 28 to the tool T of the machining head at the initial position is decreased, and therefore, the height of the machining area is decreased.

When machining the work 'w' fixed on the jig 28, the not-illustrated NC control device is started in operation. That is, the NC control device suitably operates the first servo motor 14, the second servo motor 20 and the third servo motor 24 according to a previously input program to displace the machining head 102 along the Y-axis direction, the X-axis direction and the Z-axis direction, and besides, operates a spindle motor 27 to rotate the vertical rotation driving shaft 26A and the tool T installed thereon. Besides, if necessary, the tool exchanger 3 is operated to exchange the tool T of the machining head 102, and a not-illustrated coolant supply means is suitably operated to supply coolant.

The work 'w' is machined in a predetermined shape with the tool T through the NC control device. During machining, the force for the tool T is transmitted in a loop-line L1 through the machining head 102, the second saddle 7, the first saddle 4, the base 100, the jig 28 and the work 'w', as shown in FIG. 13. In this case, when the jig 28 is fixedly provided on the front face 1c of the base 100 in a forward extending manner, the whole rigidity of the machining head 102, the second saddle 7, the first saddle 4, the base 100 and the jig 28s is effectively increased due to the shortness of the loop-line L1, and the machining precision of the work 'w' is improved.

While machining the work 'w' with the machining head 102, the coolant is supplied from the coolant supply means to smoothly cut the work 'w' and cool the cut portion, and on the other hand, the tool T cuts the work 'w' to produce chips. Such coolant and chips drop by gravity while splashing the circumference of the machining area due to rotation of the tool T. The splashed coolant and chips are prevented from splashing outward by the peripheral cover 31 (the front plane wall 31c, the right and left side plane walls 31a, 31b, the accordion horizontal plane wall 31e and so on) and the base 100 and so on, the splashed coolant and chips thereafter dropping into the hopper part 30. When the coolant is supplied to the portion cut by the tool T in a fluid manner, it flows down so as to wash the chips away. Besides, when the coolant is supplied in a mist manner, it drops in the state of being adhered to the chips.

The coolant and chips dropped into the hopper part 30 are gathered at the bottom due to gravity, dropping into the chip entrance 29a from the bottom opening. In this case, the coolant and the chips smoothly drop into the chip entrance 29a without accumulating on the surface of the base 100, because the front face 1c of the base 100 is formed in a single plane in the Z-axis direction. Accordingly, since the conventional phenomenon in which the chips heated to a high temperature by friction accumulate on and heat the base 100 does not occur, the base 100 is restricted from thermal deformation caused by the chips, and the machining precision is maintained good.

The coolant arriving at the chip entrance 29a passes through a space of the endless carrying belt 29c, arriving at the bottom of the casing 29d and flowing in the tank 29e. The chips are supported on the endless carrying belt 29c, and carried towards the chip exit 29b by displacement of the endless carrying belt 29c. The coolant adhered to the chips is separated by gravity in a process in which the chips are carried by the endless carrying belt 29c, dropping to the bottom of the casing 29d and flowing into the tank 29e. The coolant stored in the tank 29e is used again, and the chips discharged from the chip exit 29b are contained in a receptacle arranged under it.

Figure 15A:
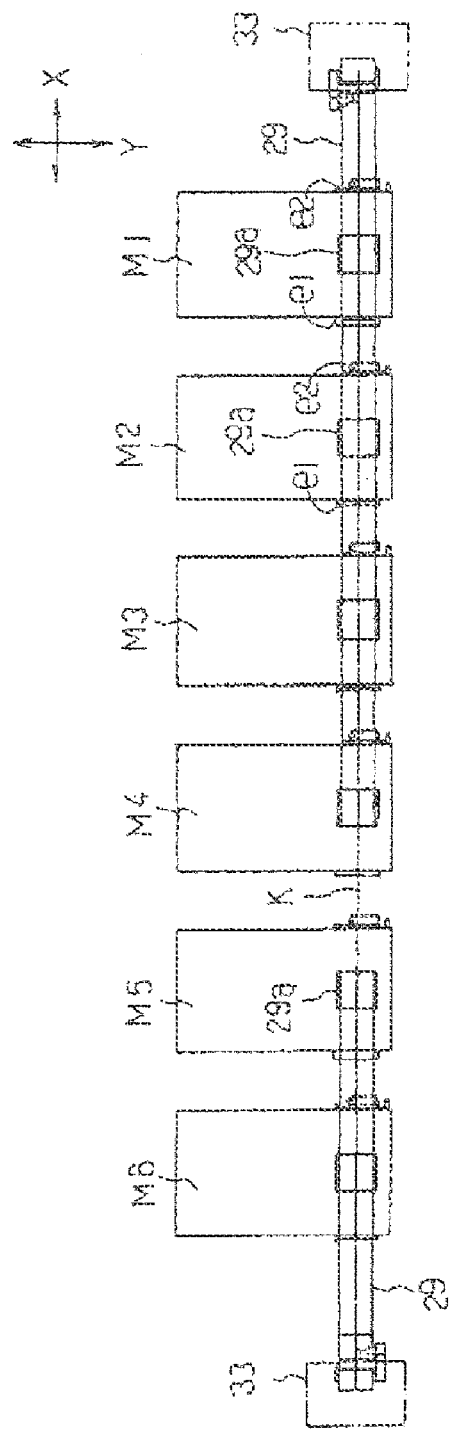
FIG. 15A is a plan view and FIG. 15B is a partially schematic side view.
Figure 15B:
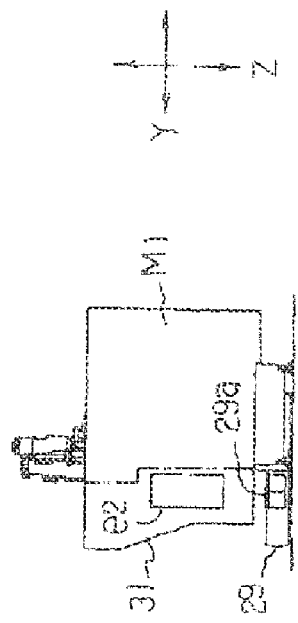
Figure 16:
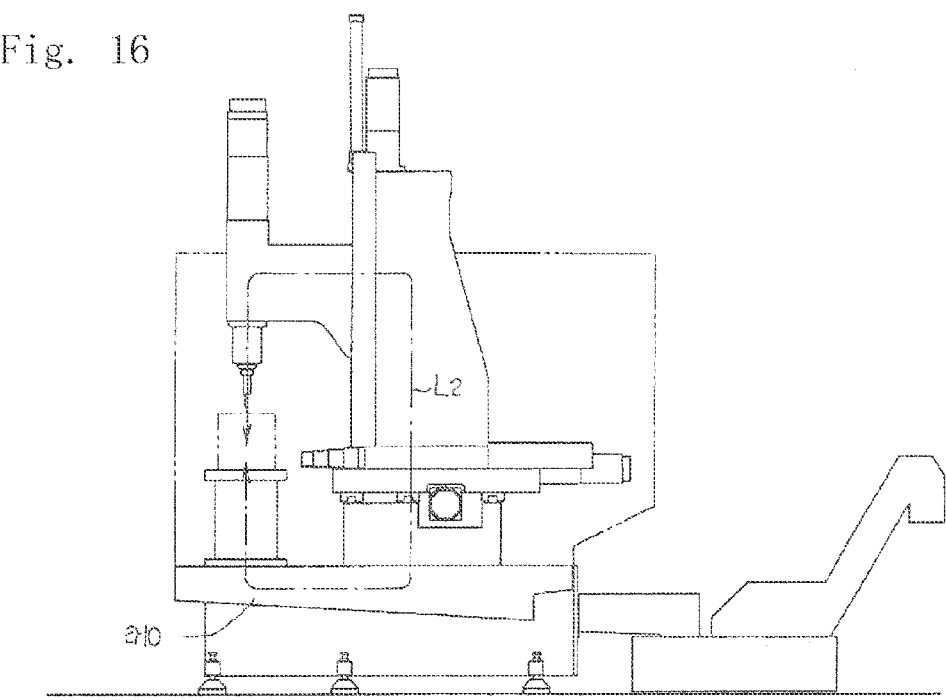
FIG. 16 is a side view showing a transmission course of the force produced during machining in the conventional machine tool.

Another use example about the vertical machining center will be explained. FIG. 14 and FIG. 15 show six vertical machining centers arranged in a row. FIG. 14A and FIG. 15A are plan views, and FIG. 14B and FIG. 15B are side views, respectively. A portion of the side view of FIG. 15 is omitted.

In FIG. 14, the vertical machining centers M1 to M6 are arranged so as to make the Y-axis direction orthogonal to a machining line 'k', and an independent chip conveyer 29 for carrying the chips produced by the vertical machining centers M1 to M6 along the Y-axis direction is provided. The chips are carried out rearward of the base 100 by the chip conveyers 29 corresponding to the independent vertical machining centers M1 to M6 to be gathered in receptacles 33. On the machining line 'k', a power transportation device 34 for carrying the work 'w' along the X-axis direction and the Z-axis direction is provided. The numerals e1 and e2 are power switching openings provided in the side plane walls 31a, 31b, and 35 is a temporary table for work.

On the other hand, in FIG. 15, four vertical machining centers M1 to M4 are provided with a common single chip conveyer 29 for carrying the chips produced by the machining centers M1 to M4 in the X-axis direction, and another two machining centers M5, M6 are provided with another common single chip conveyer 29 for carrying the chips produced by the machining centers M5, M6 in the X-axis direction. In this case, the chips produced by the vertical machining centers M1 to M6 drop into their correspondent chip entrances 29a, from which they are carried out by the corresponding chip conveyers 29 and gathered in the receptacles 33. Other component members do not change relative to those shown in FIG. 14.

In FIG. 14 and FIG. 15, the power transportation device 34 arranges the works 'w' on the work supporting members of the jigs 28 of the vertical machining centers M1 to M6 in order by forwardly carrying the works 'w' on the machining line 'k' in the X-axis direction. Accordingly, each of the works 'w' is intermittently carried to the left side of the figure on the machining line, and automatically machined by the six vertical machining centers M1 to M6 in order.

A second group of embodiments of the present invention and a third group of embodiments of the present invention will be explained below.

Figure 17:
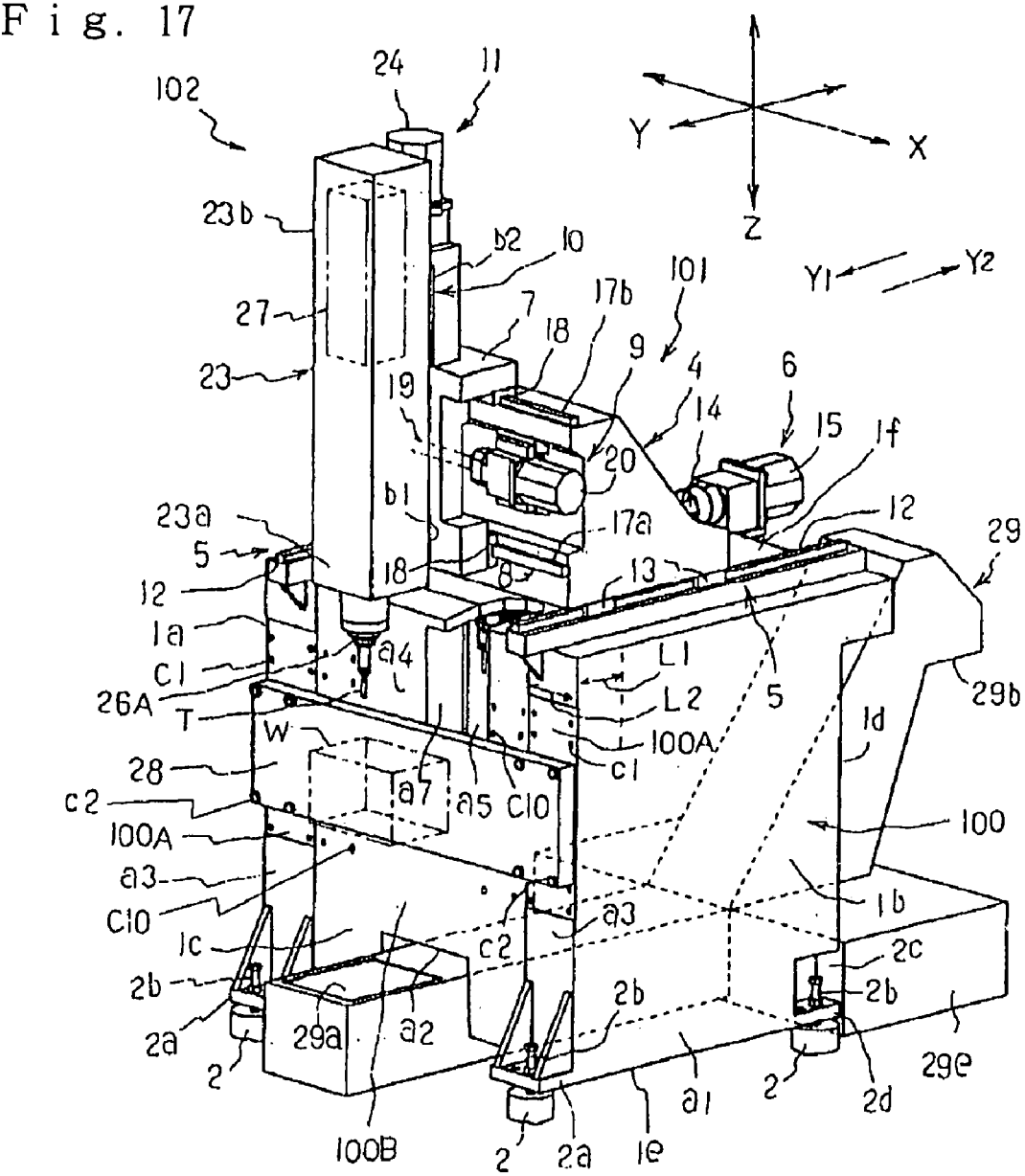
FIG. 17 is a partially schematic perspective view of the vertical machining center of the second embodiment related to the second invention and the third invention.
Figure 18:
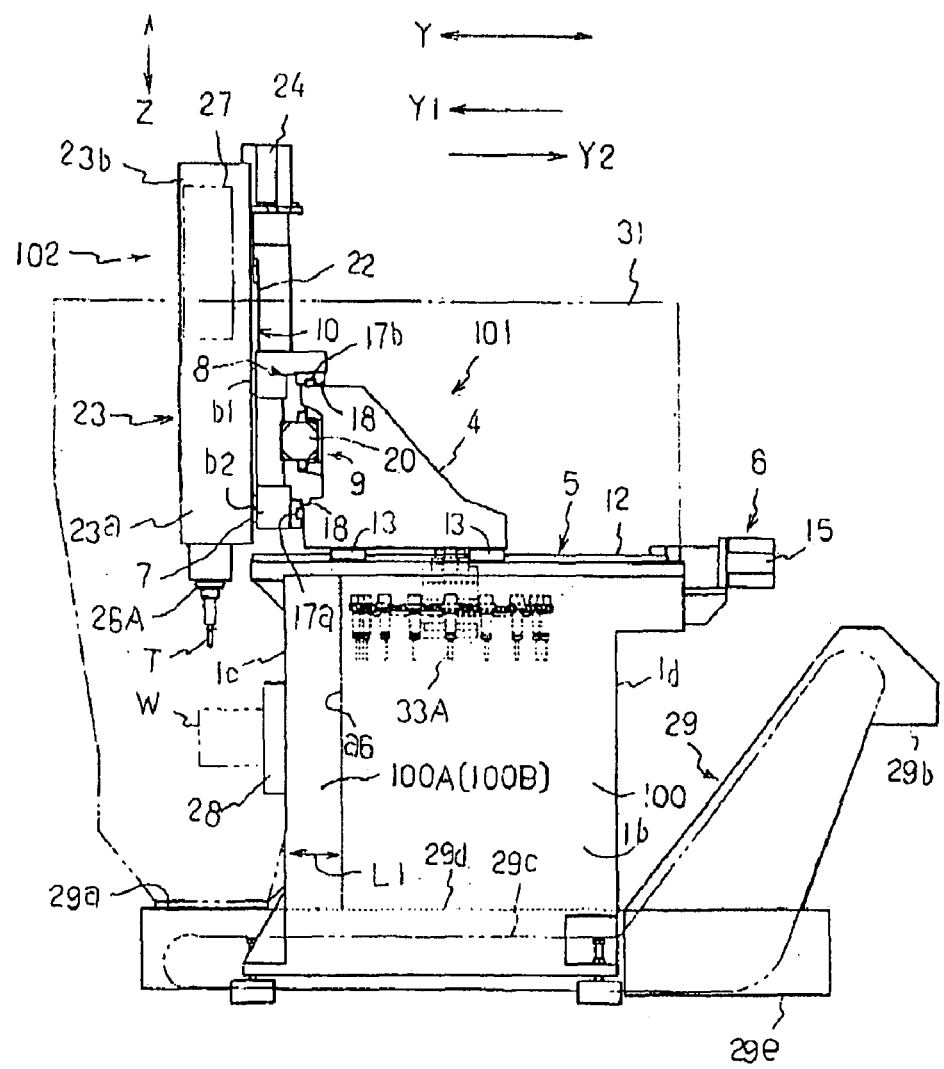
FIG. 18 is a side view of the vertical machining center of the second embodiment.
Figure 19:
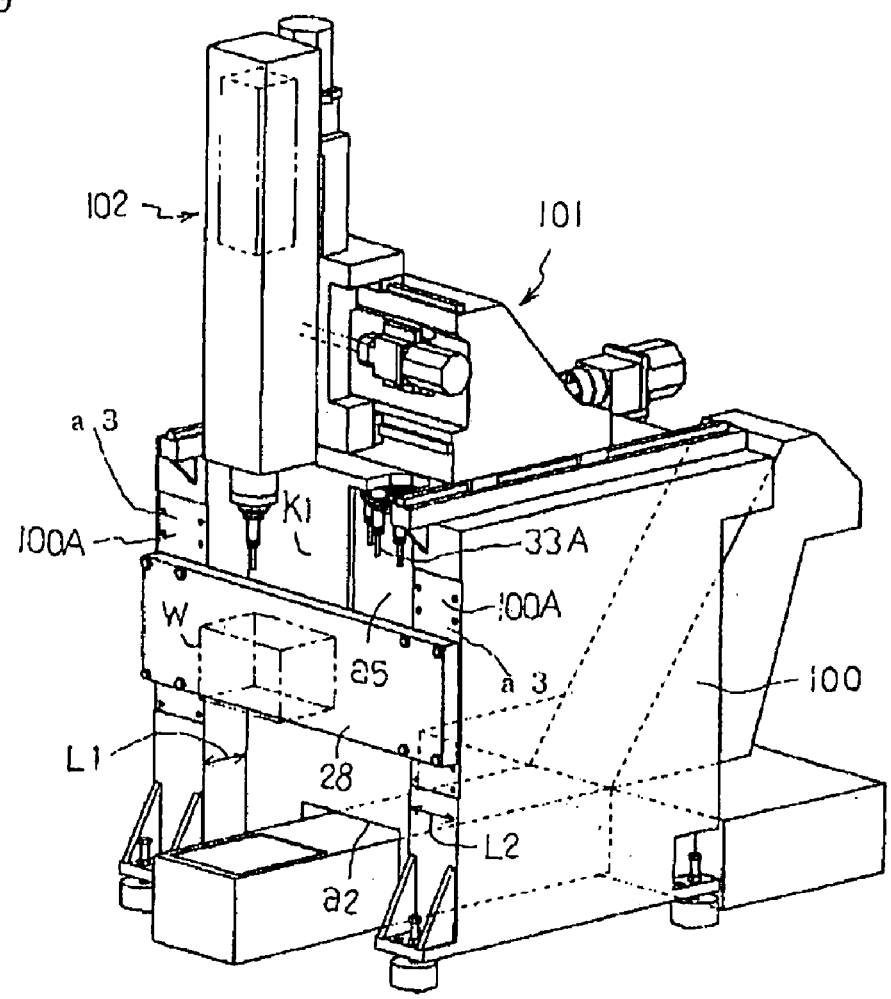
FIG. 19 is a perspective view showing the state that a lateral intermediate front part of the base is removed from the vertical machining center in FIG. 17.
Figure 20:
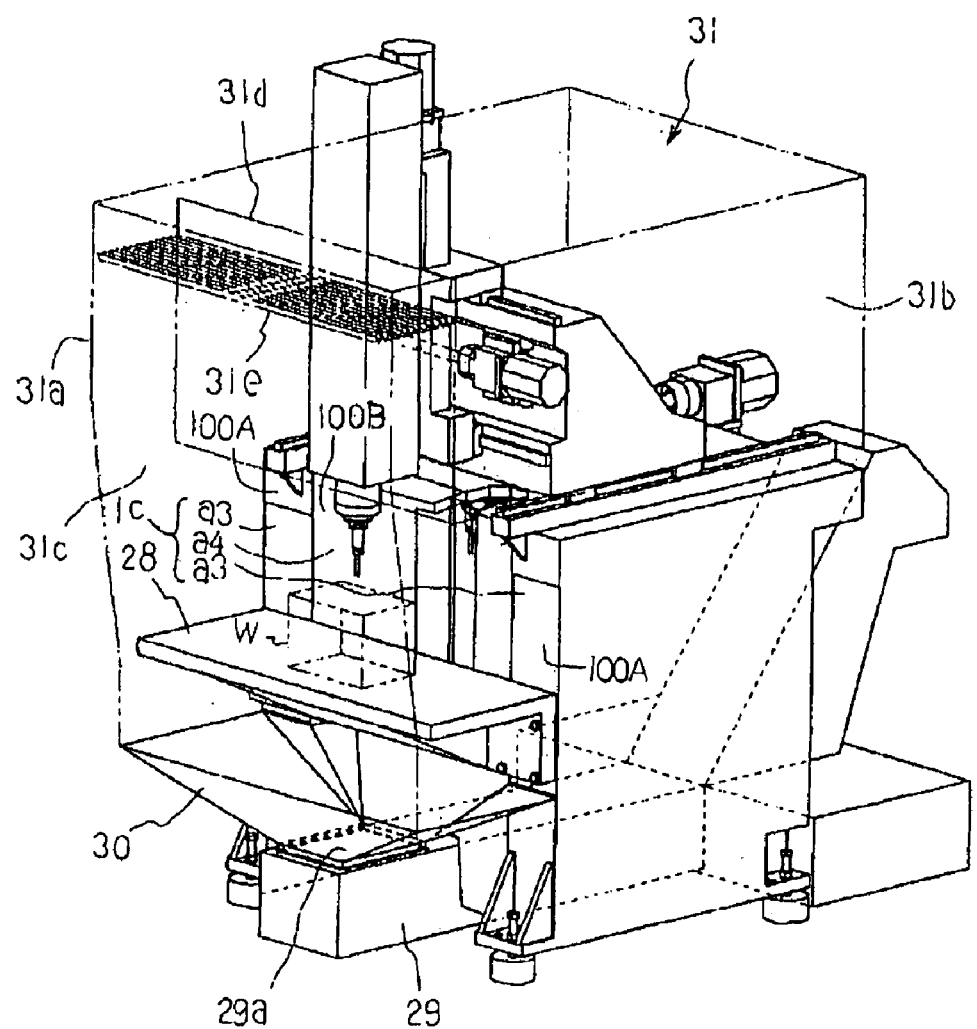
FIG. 20 is a perspective view of the vertical machining center wherein a jig shown in FIG. 17 is modified.
Figure 21:
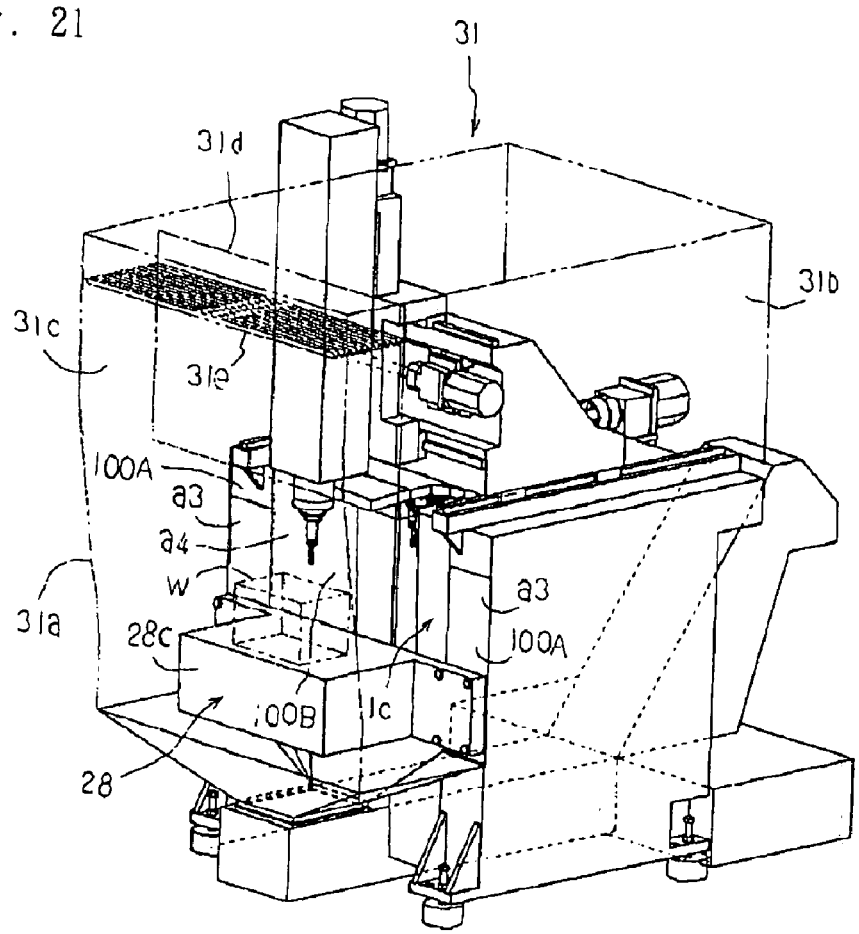
FIG. 21 is a perspective view of the vertical machining center wherein the jig of FIG. 17 is modified.
Figure 22:
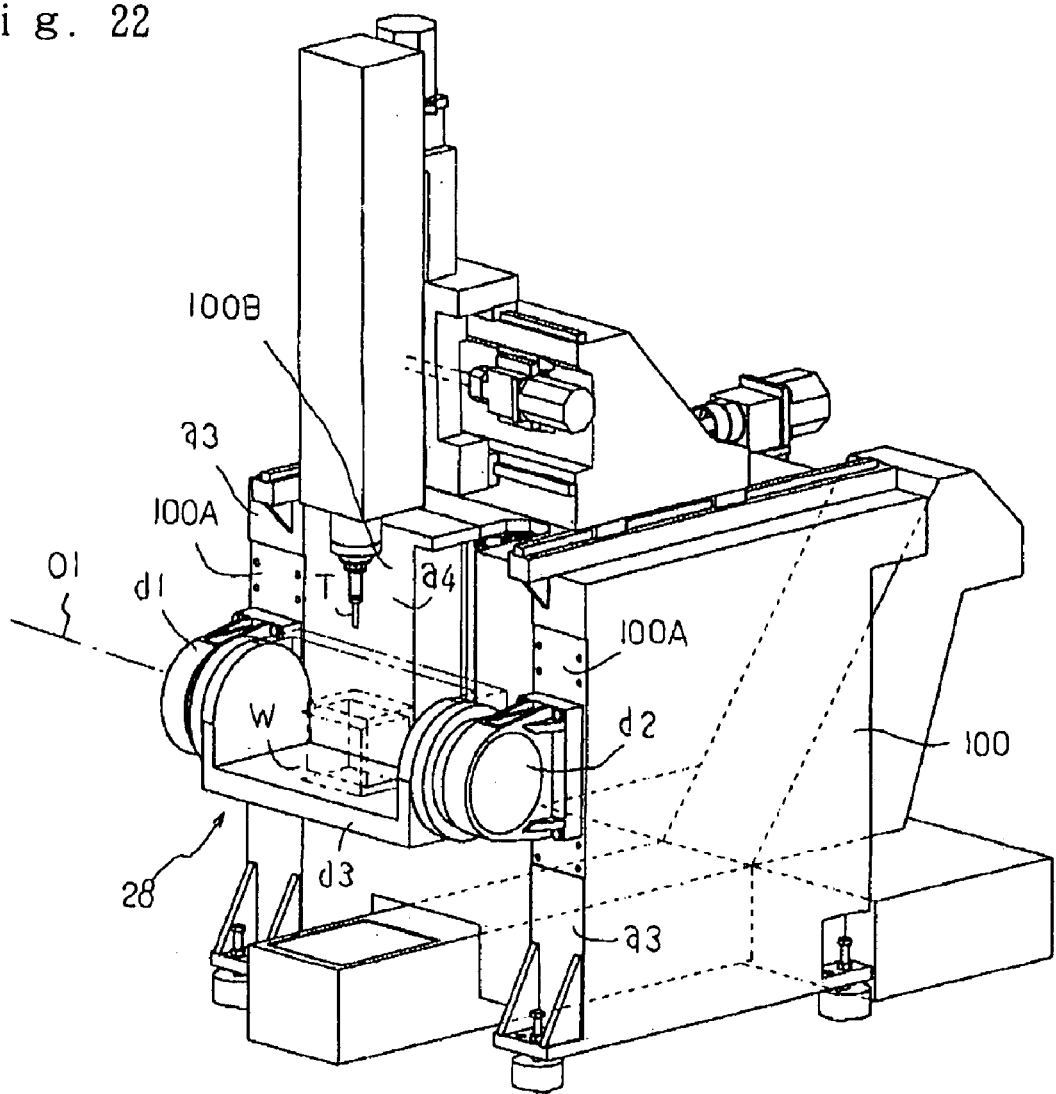
FIG. 22 is a perspective view of the vertical machining center wherein the jig of FIG. 17 is modified.
Figure 23:
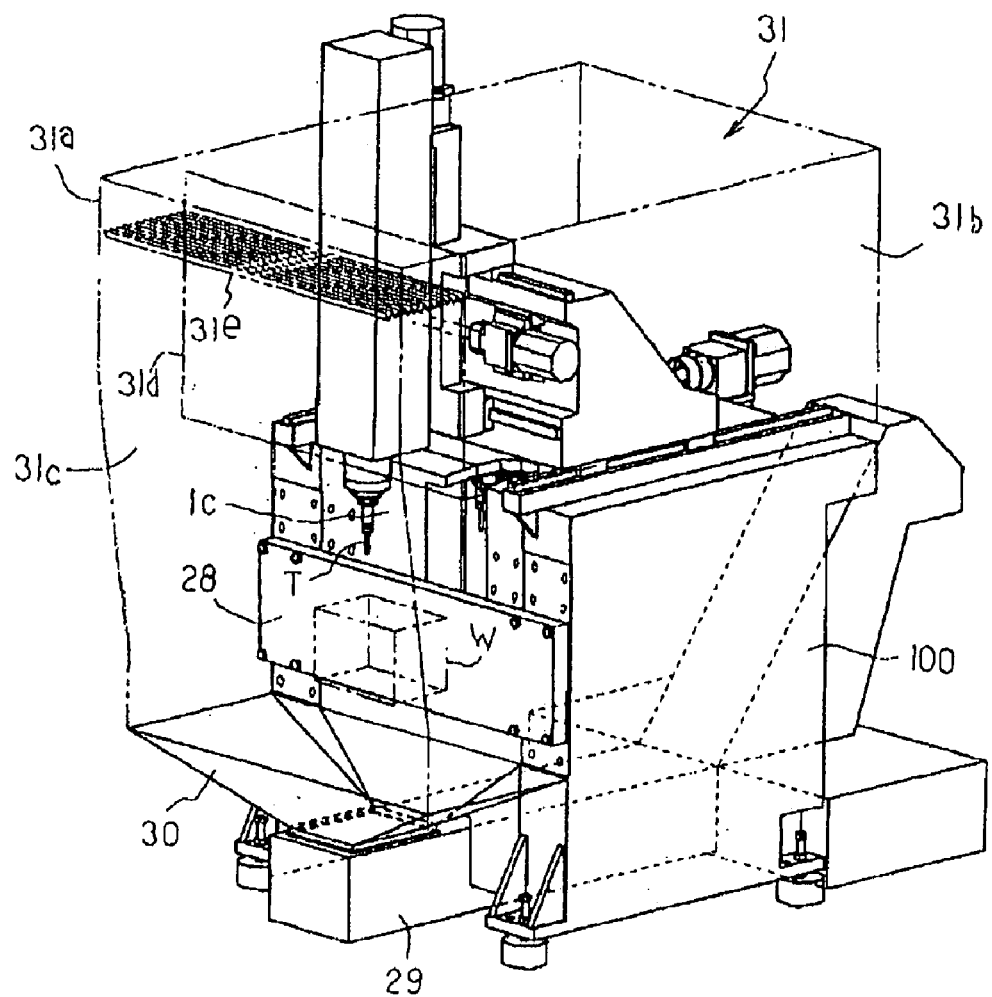
FIG. 23 is a perspective view showing the state that a hopper part is provided to the vertical machining center of FIG. 17.
Figure 24:
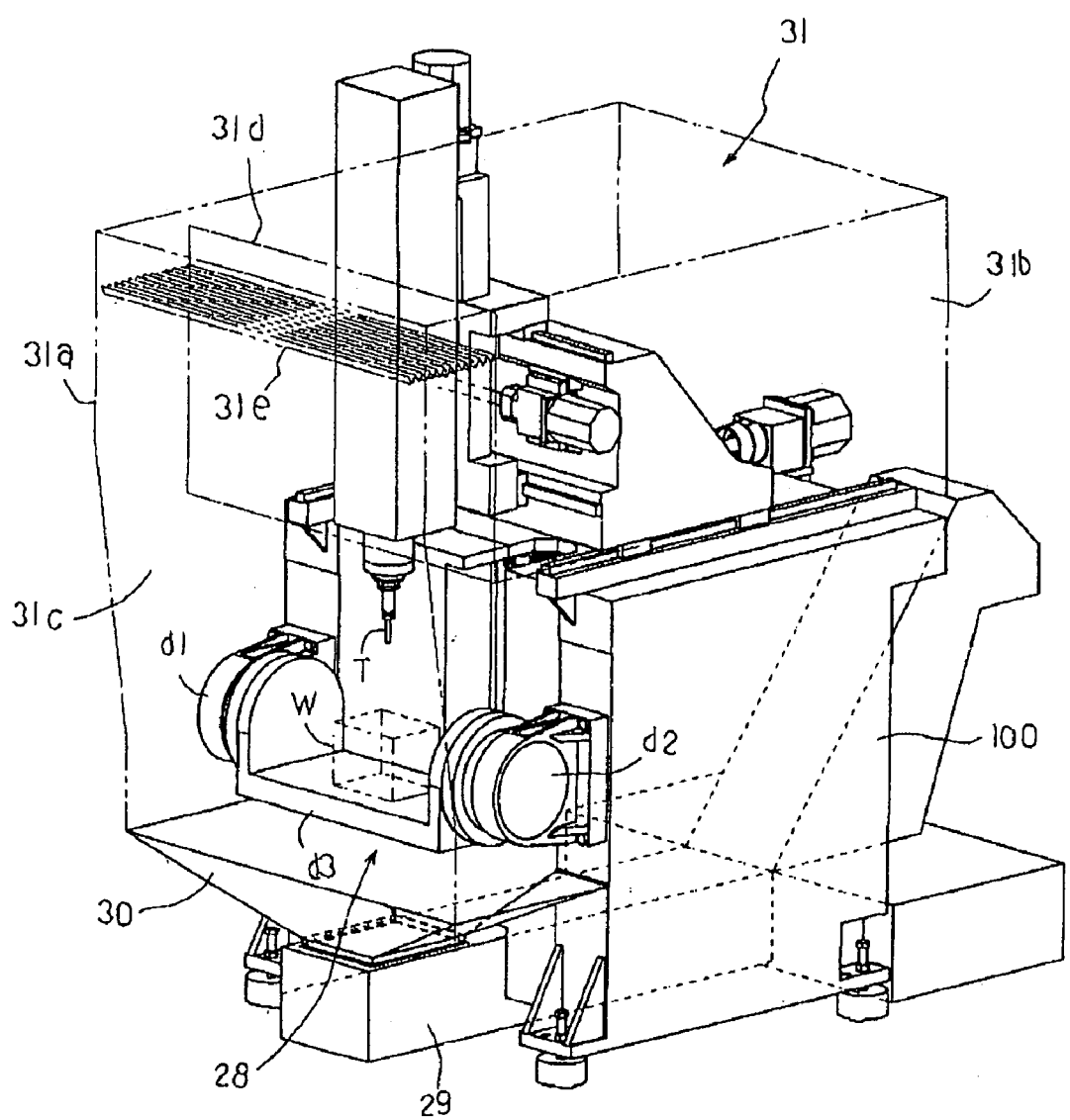
FIG. 24 is a perspective view showing the state that a circumference cover is provided to the vertical machining center of FIG. 22.
Figure 25:
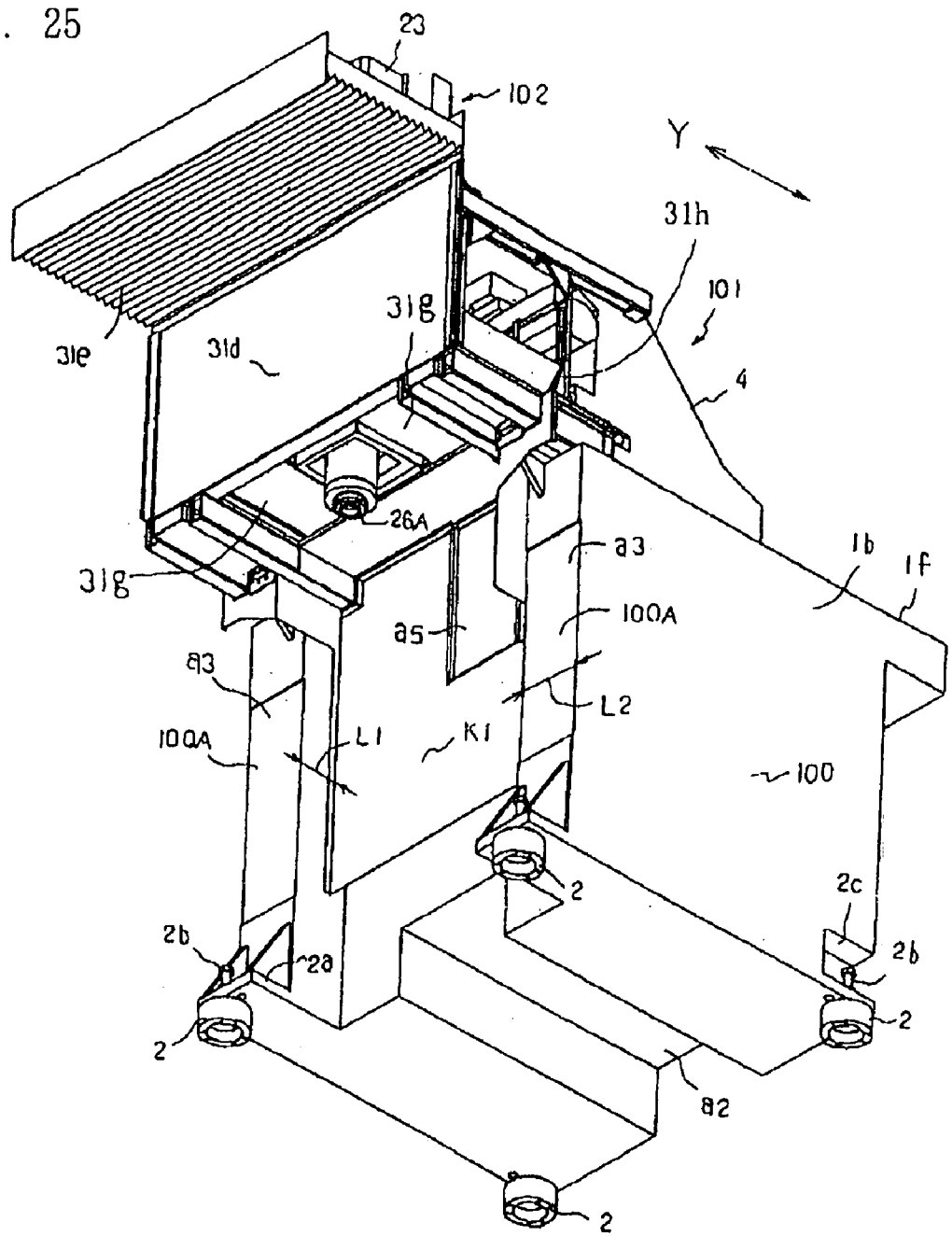
FIG. 25 is a view wherein the vertical machining center is viewed from a diagonal bottom in the state that the jig is abbreviated.
Figure 26:
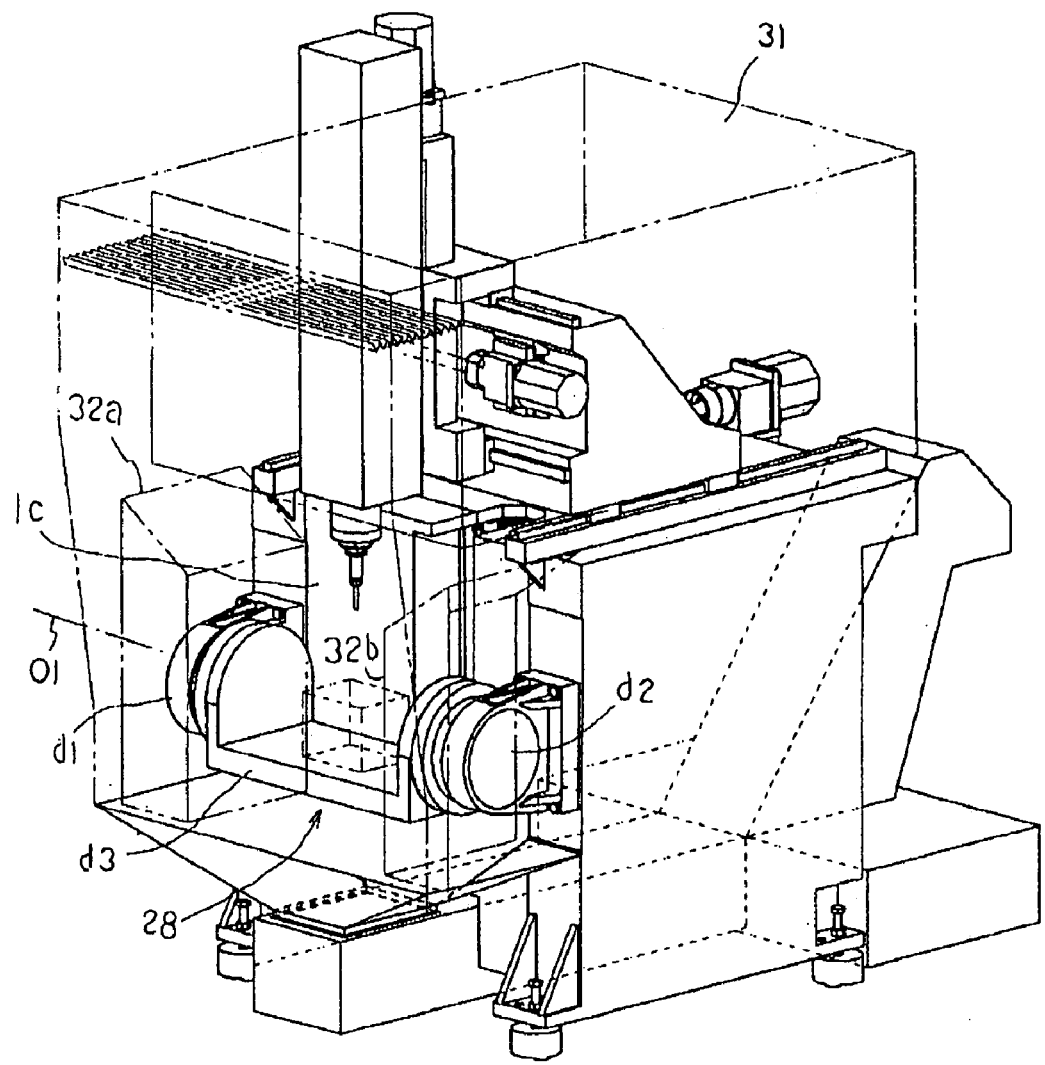
FIG. 26 is a perspective view showing the state that an inside cover is provided to the vertical machining center of FIG. 24.
Figure 27:
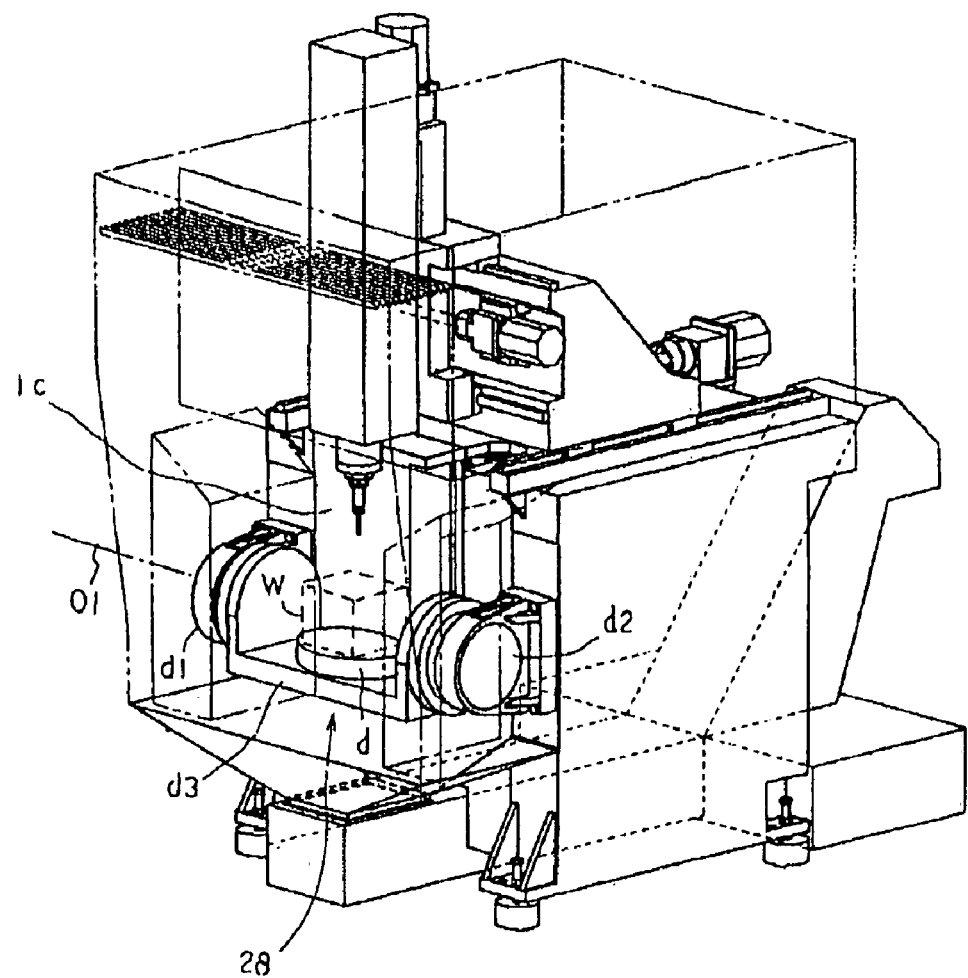
FIG. 27 is a perspective view showing the state that a table is provided to the jig of the vertical machining center of FIG. 26.
Figure 28:
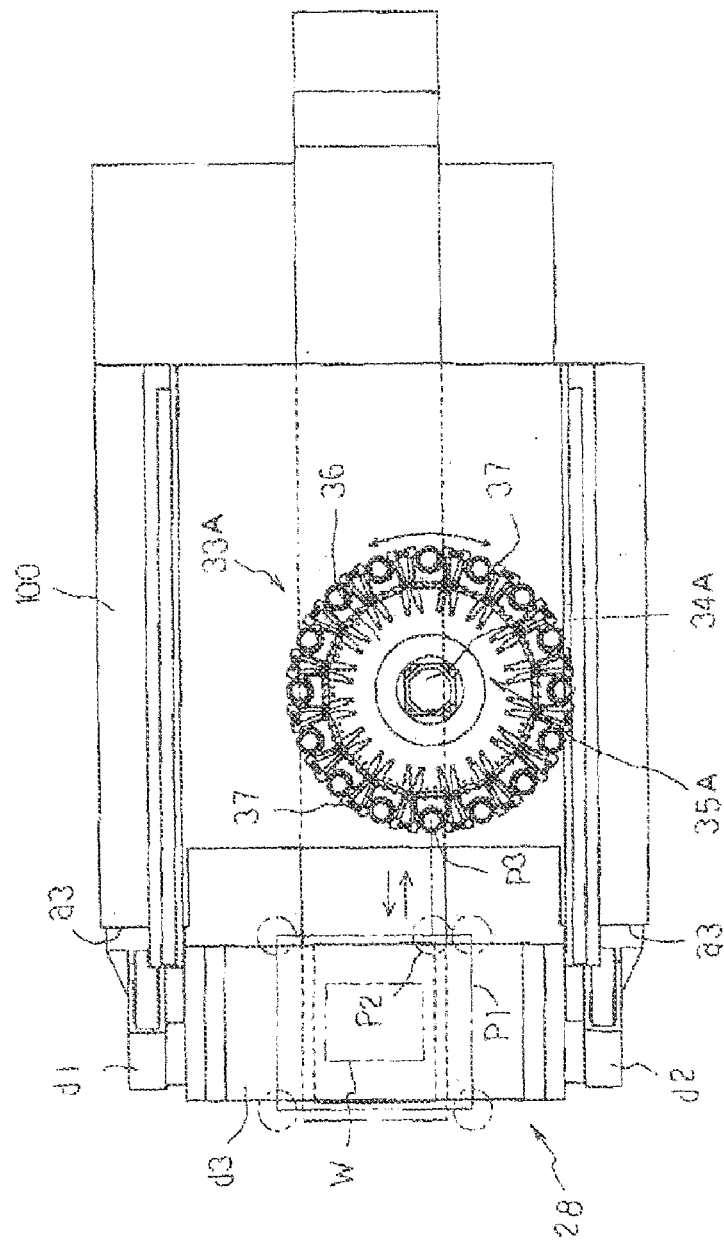
FIG. 28 is a view for explaining a tool changer and so on of the vertical machining center as viewed from right above.
Figure 29:
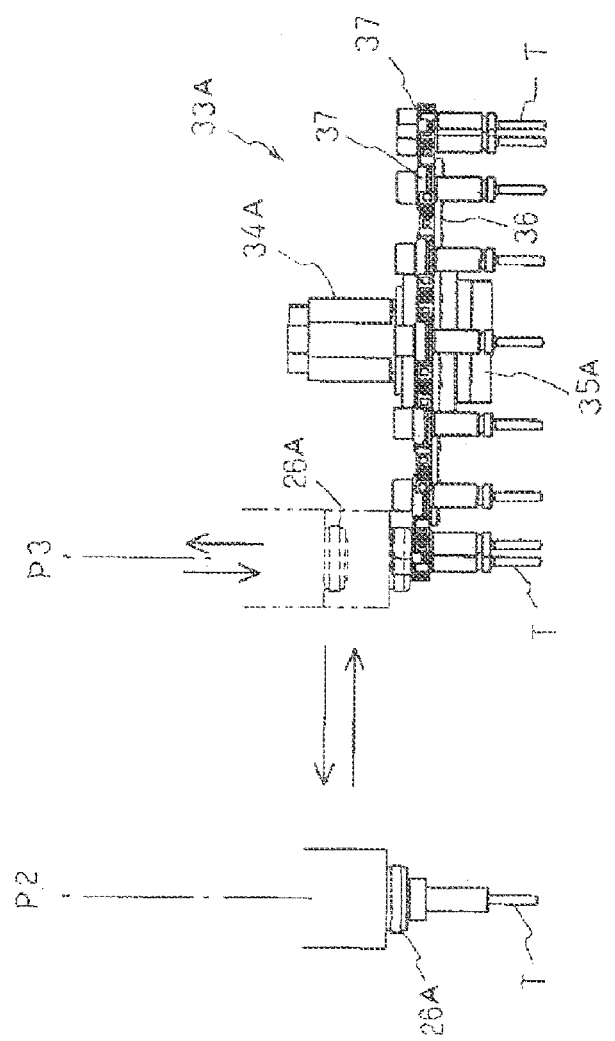
FIG. 29 is a view for explaining an operation of the tool changer as viewed from a side.
Figure 30:
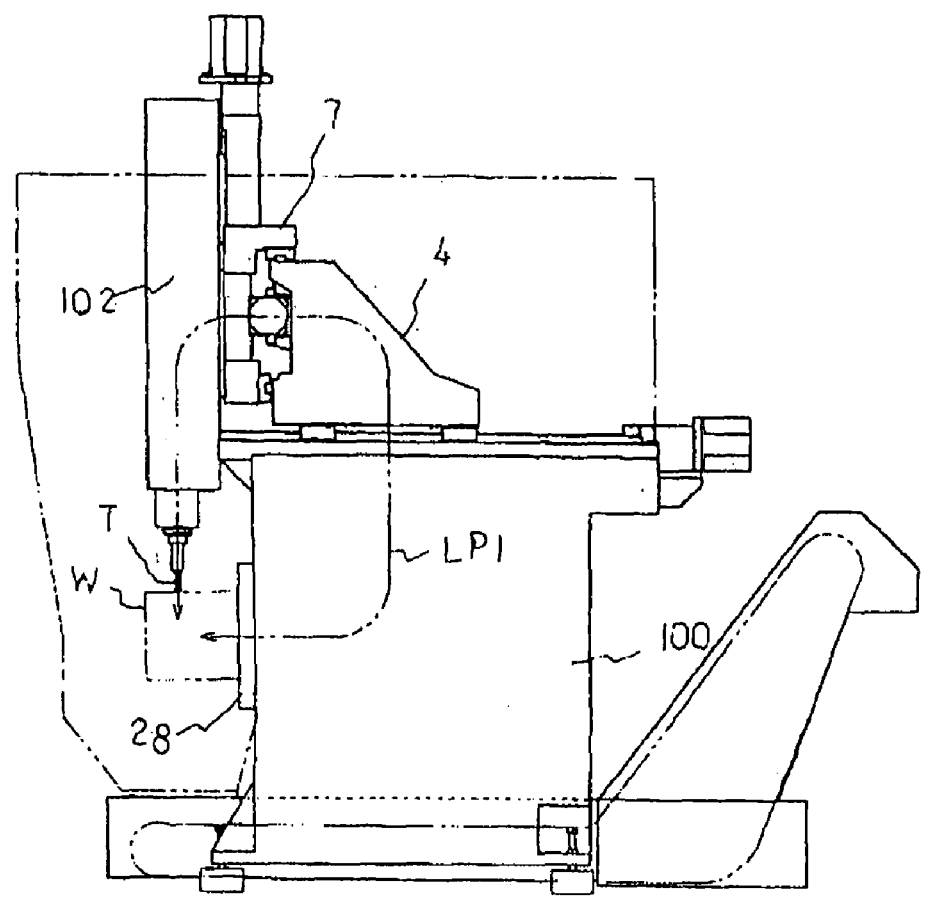
FIG. 30 is a view for explaining the state that the force of the vertical machining center during machining is transmitted.
Figure 31:
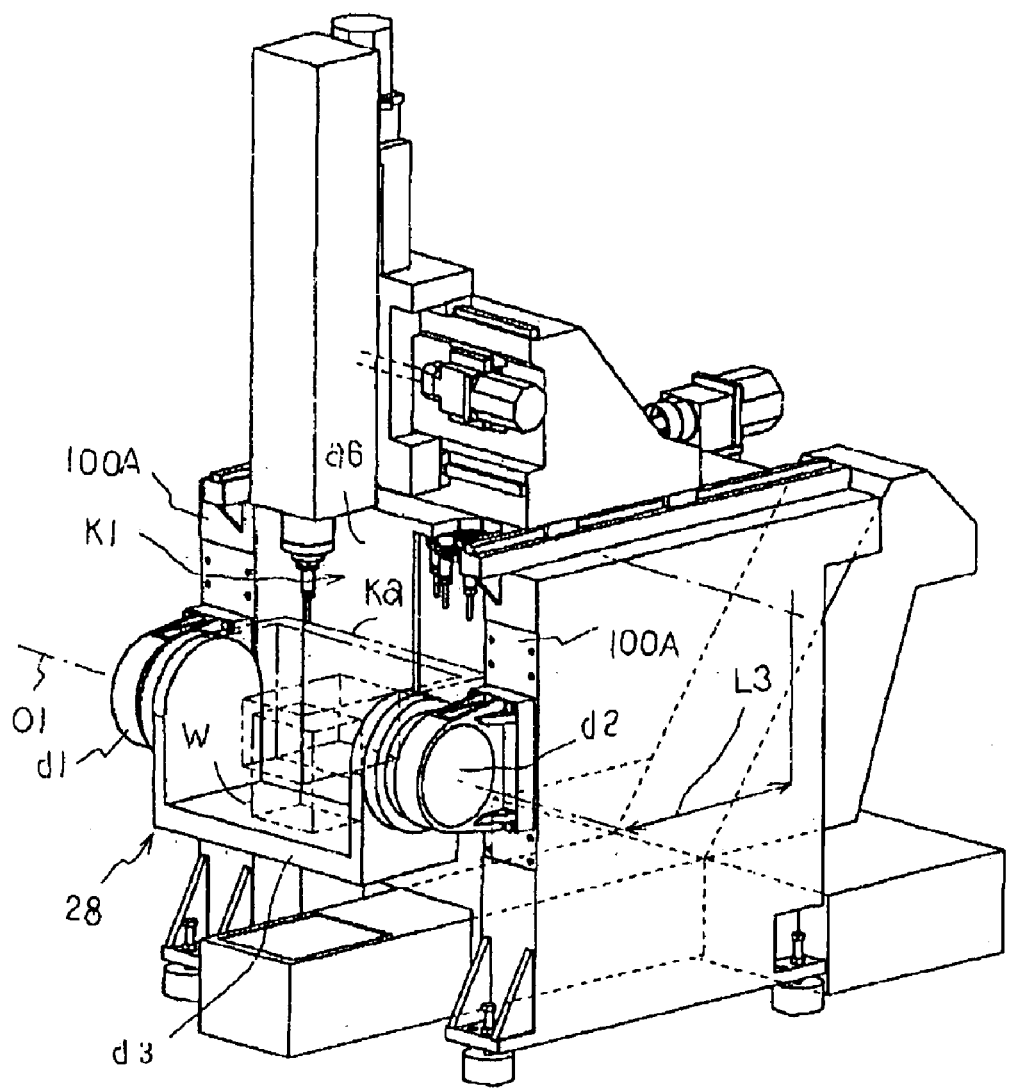
FIG. 31 is a perspective view of the state that a longitudinal intermediate front part of the base of the vertical machining center of FIG. 22 is removed.
Figure 32:
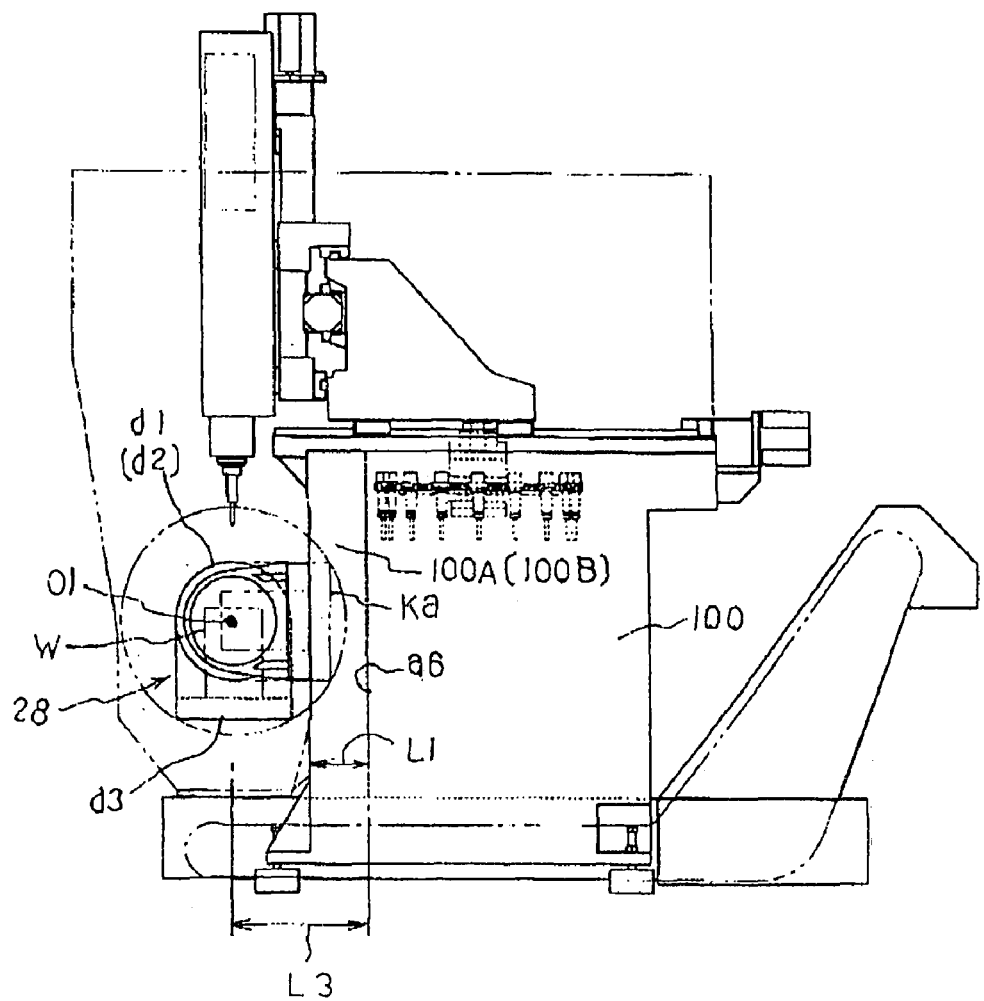
FIG. 32 is a side view of the vertical machining center of FIG. 31.
Figure 33:
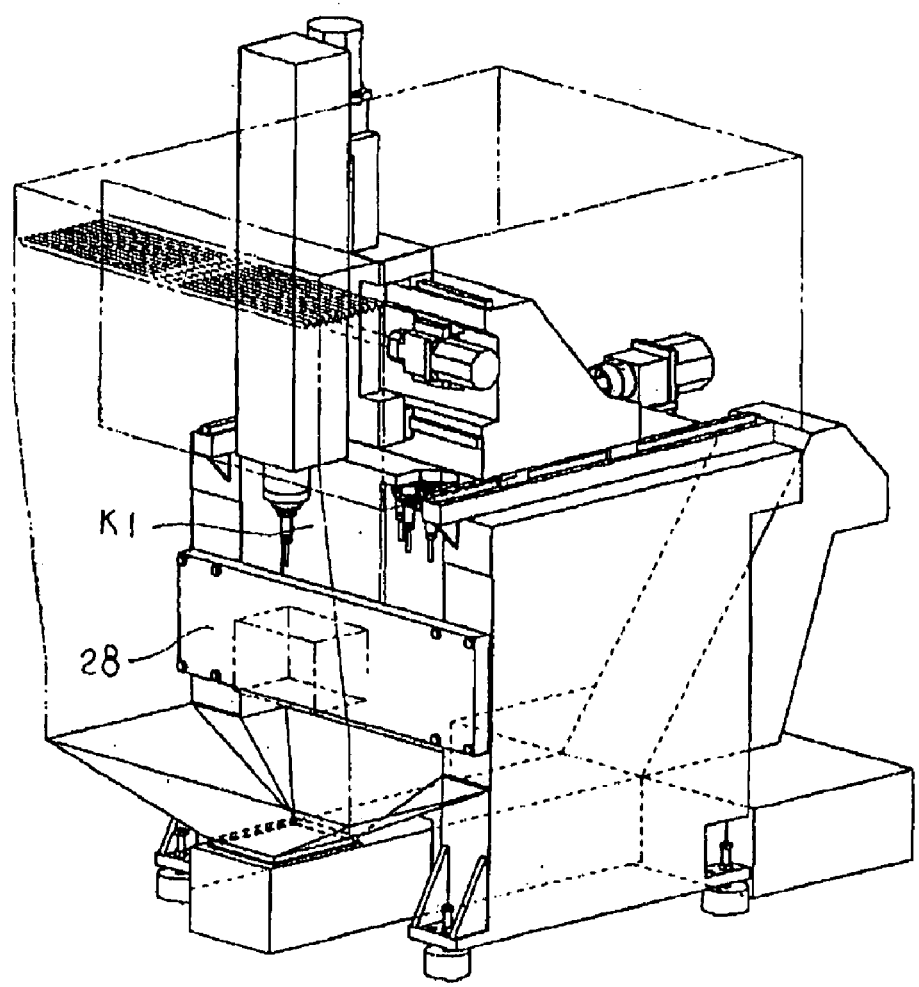
FIG. 33 is a perspective view of the state that a longitudinal intermediate front part of the base of the vertical machining center of FIG. 23 is removed.
Figure 34:
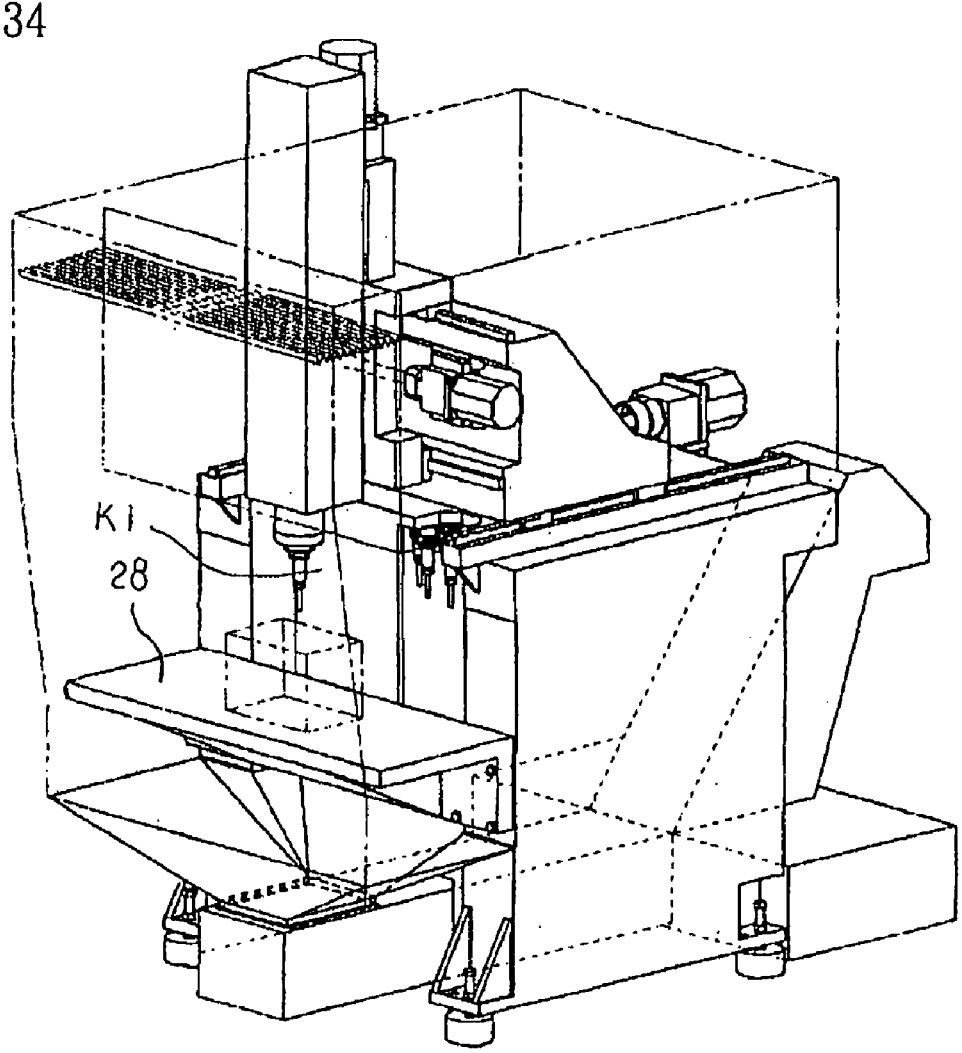
FIG. 34 is a perspective view of the state that a longitudinal intermediate front part of the base of the vertical machining center of FIG. 20 is removed.
Figure 35:
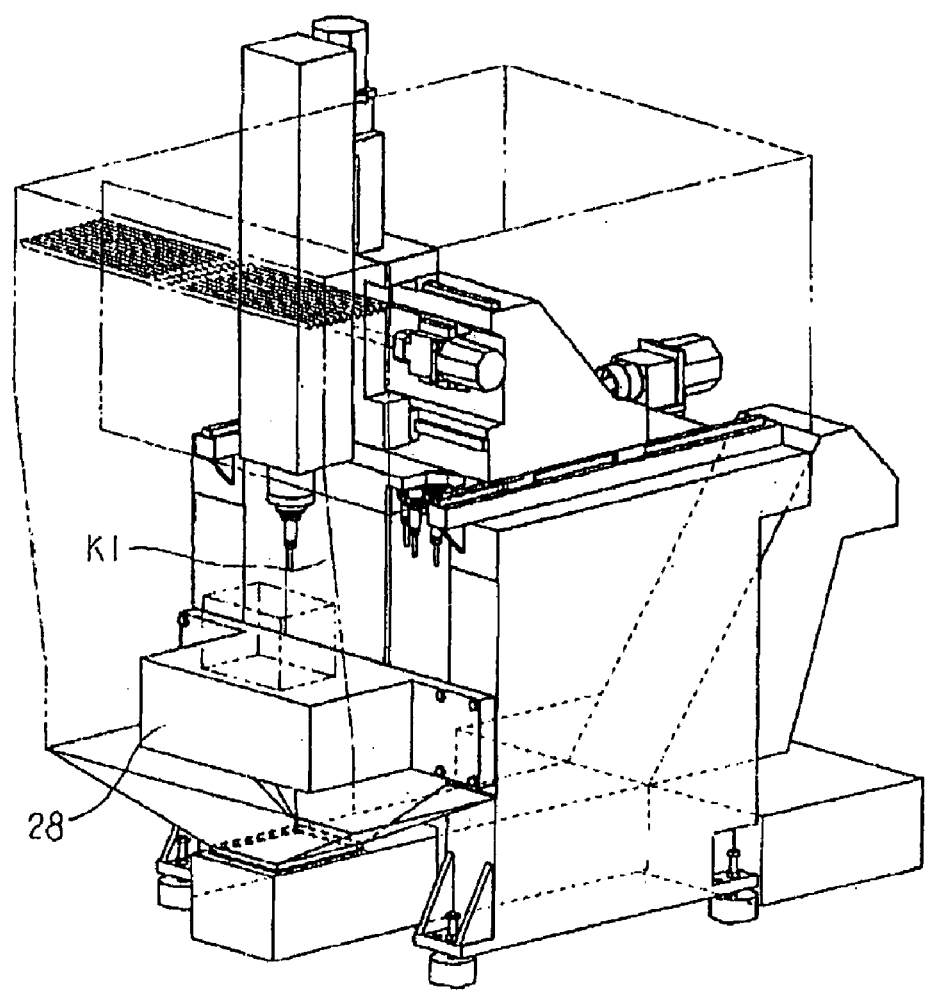
FIG. 35 is a perspective view of the state that a longitudinal intermediate front part of the base of the vertical machining center of FIG. 21 is removed.
Figure 36:
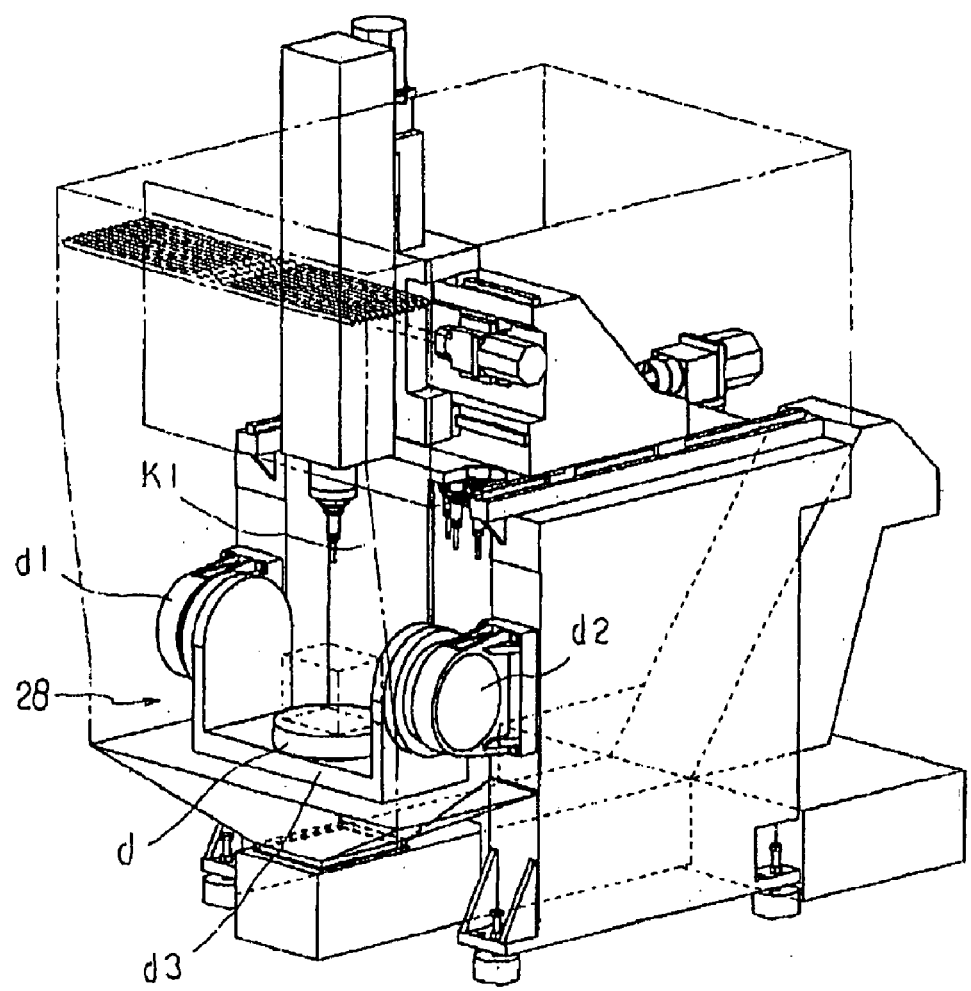
FIG. 36 is a perspective view of the state that a longitudinal intermediate front part of the base of the vertical machining center of FIG. 27 is removed.
Figure 37:
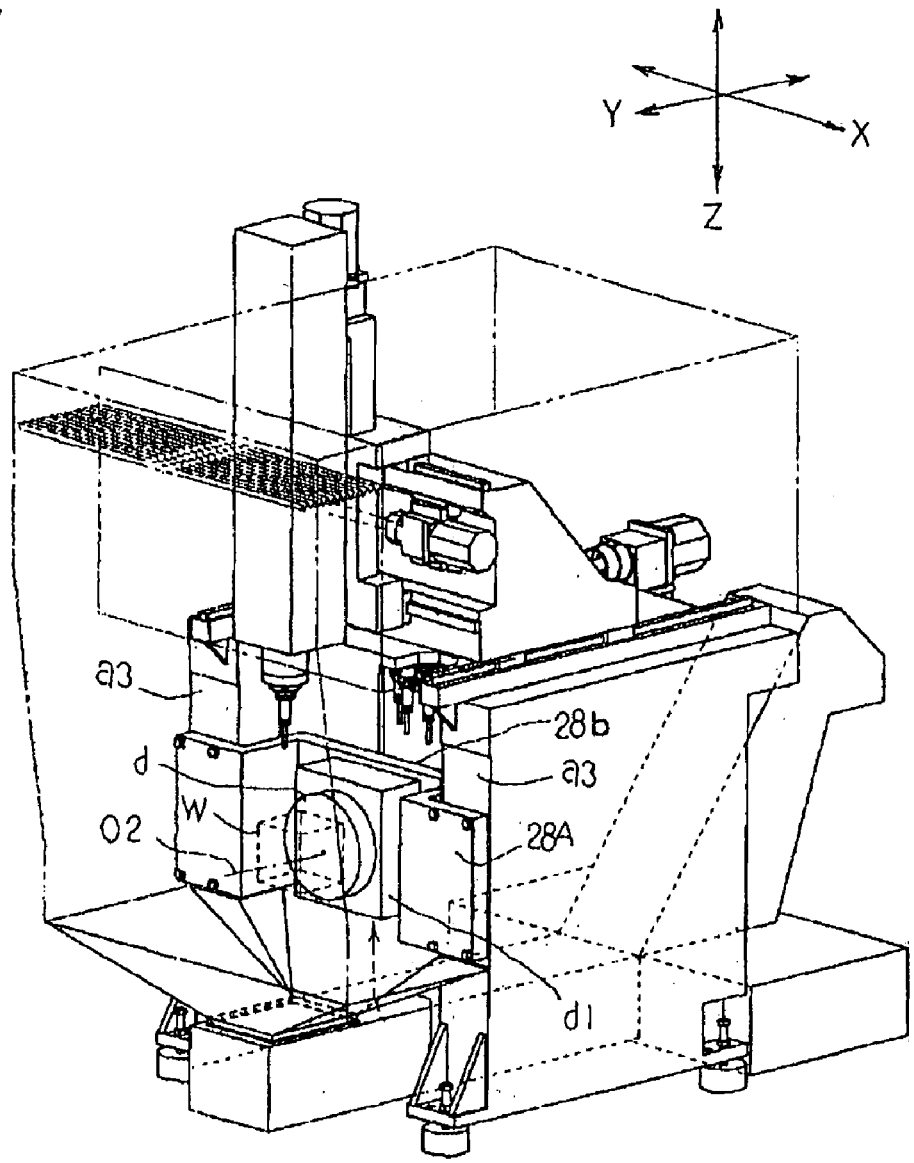
FIG. 37 is a perspective view of a vertical machining center wherein the jig in FIG. 33 is modified.
Figure 38A:
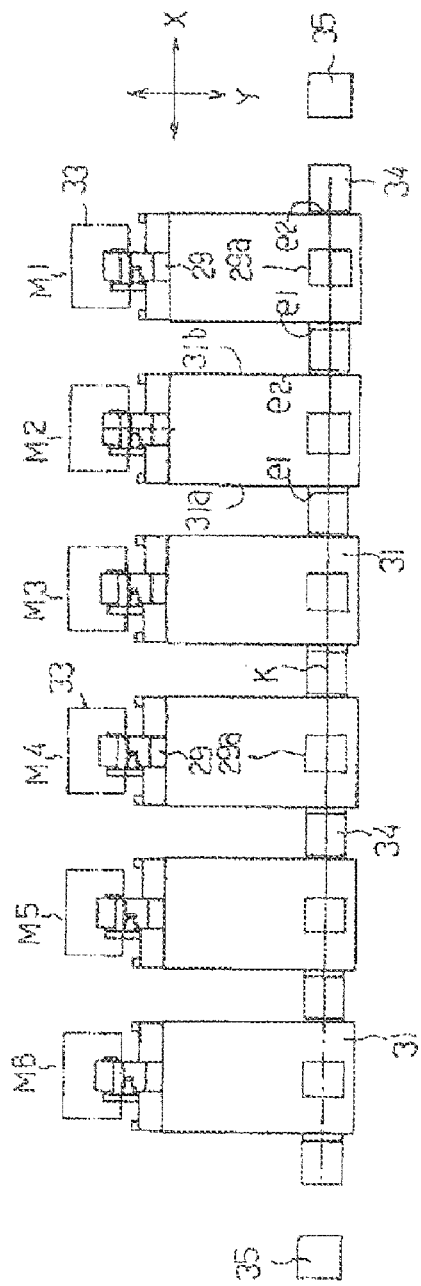
FIG. 38A is a plan view and FIG. 38B is a side view.
Figure 38B:
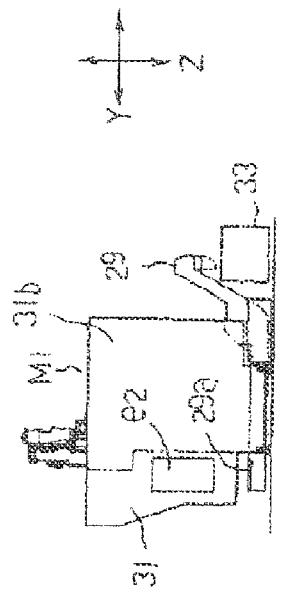
Figure 40:
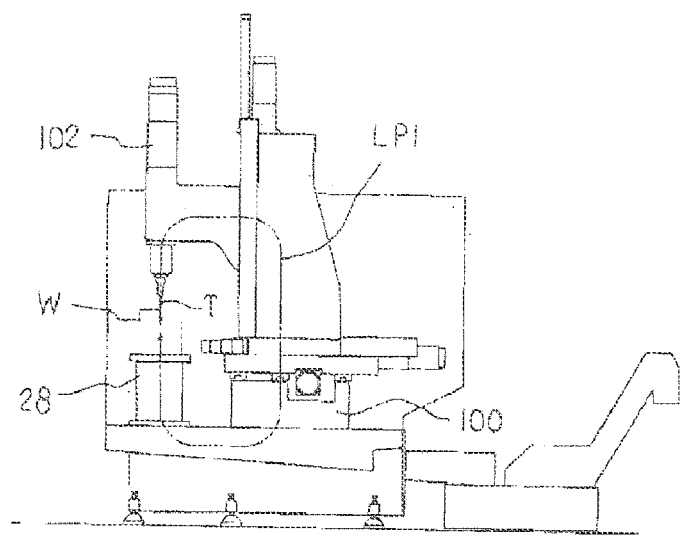
FIG. 40 is a side view showing the transmission course of the force produced during machining in the conventional machine tool.

FIG. 17 to FIG. 39 show a vertical machining center as a machine tool related to the second and third groups of embodiments according to the present invention. FIG. 17 is a partially schematic perspective view of the vertical machining center of a first example; FIG. 18 is a side view of the vertical machining center; and FIG. 19 is a perspective view showing the state in which a laterally intermediate front part of the base is removed from the vertical machining center in FIG. 17. FIG. 20 is a perspective view of the vertical machining center wherein the jig shown in FIG. 17 is modified; FIG. 21 is a perspective view of the vertical machining center wherein the jig of FIG. 17 is modified, FIG. 22 is a perspective view of the vertical machining center wherein the jig of FIG. 17 is modified in another way; and FIG. 23 is a perspective view showing the state in which a hopper part is provided with the vertical machining center of FIG. 17. FIG. 24 is a perspective view showing the state in which a peripheral cover is provided for the vertical machining center of FIG. 22; FIG. 25 is a perspective view from the front, right side and bottom of the vertical machining center of FIG. 24, in the jig is removed; and FIG. 26 is a perspective view showing the state in which an inside cover is provided for the vertical machining center of FIG. 24. FIG. 27 is a perspective view showing the state in which a table is provided for the jig of the vertical machining center of FIG. 26; FIG. 28 is an explanatory view of a tool changer and so on of the vertical machining center as viewed from above; FIG. 29 is an explanatory view showing the operation of the tool changer as viewed from a side; and FIG. 30 is an explanatory view showing the line through which the force of the vertical machining center during machining the work is transmitted. FIG. 31 is a perspective view of the state in which the longitudinal intermediate front part of the base of the vertical machining center of FIG. 22 is removed, and FIG. 32 is a side view of the vertical machining center of FIG. 31. FIG. 33 is a perspective view of the state in which the longitudinal intermediate front part of the base of the vertical machining center of FIG. 23 is removed. FIG. 34 is a perspective view of the state in which the longitudinal intermediate front part of the base of the vertical machining center of FIG. 20 is removed. FIG. 35 is a perspective view of the state in which the longitudinal intermediate front part of the base of the vertical machining center of FIG. 21 is removed. FIG. 36 is a perspective view of the state in which the longitudinal intermediate front part of the base of the vertical machining center of FIG. 27 is removed. FIG. 37 is a perspective view of a vertical machining center wherein the jig in FIG. 33 is modified. FIGS. 38A and 38B show six vertical machining centers side-by-side, FIG. 38A being a plan view and FIG. 38B being a side view. FIGS. 39A and 39B also show six vertical machining centers side-by-side, FIG. 39A being a plan view and FIG. 39B being a partially schematic side view.

As shown in FIG. 17 to FIG. 19, the vertical machining center of the invention comprises the base 100, the guide driving means 101 and the machining head 102.

The base 100 is fixedly arranged on a floor and the whole shape is roughly rectangular in which a lateral (an X-axial) length is approximately 1.4 m-2.8 m, a longitudinal (a Y-axial) length is approximately 2 m-4 m, and a vertical (a Z-axial) length is approximately 1 m-3 m. Each of the right and left side faces 1a, 1b is formed in a single plane orthogonal to a lateral direction, and the greater part of each of the front face 1c and the rear face 1d is formed in a single plane orthogonal to the longitudinal direction.

A bed part a1 is the lower part of the base 100, and faces the floor. Supporting members 2 adjustable in height are provided near four corners of the bottom 1e of the bed 1a. Each of the forward right and left support members 2, 2 has an added extending part 2a, which extends in the forward direction Y1 to each of the right and left ends of the bottom part of the front face of the bed part a1, but not laterally outward from each of the right and left side faces 1a, 1b of the base 100. In this case, the support member 2 is fitted to the bottom of the vertical screw member 2b so as to support it by screwing the vertical screw member 2b in the added extending part 2a. Each of the rearward right and left support members 2, 2 has a recess 2c formed in a 'C' shape as viewed from the side to each of the right and left ends of the bottom of the rear face of the bed a1. The rearward right and left support members 2, 2 are arranged so as not to extend laterally outward from each of the right and left side faces 1a, 1b of the base 100 or rearwardly in the Y2 direction from the rear face 1d of the base 100. In this case, the support member 2 is fitted to the bottom of the vertical screw member 2b so as to support it by screwing the vertical screw member 2b in the bottom part 2d under the recess 2c.

The front part of the base 100 comprises a pair of right and left lateral end front parts 100A, 100A and a laterally intermediate front part 100B. Each of the lateral end front parts 100A includes a vertical overall length (or a vertical roughly overall length) of the right and left end parts of the front face 1c. A longitudinal length L1 of each lateral front end part 100A is approximately 200 mm-300 mm, and a lateral length L2 is more than 100 mm (preferably approximately 200 mm-300 mm). The laterally intermediate front part 100B is formed in the front part of the base 100 between the lateral end front parts 100A, 100A, and the front face 1c, which is arranged between the front parts of the front end faces a3, a3 of the lateral end front parts 100A, 100A, is formed in the front end face a4.

Making the longitudinal length L1 approximately 200 mm-300 mm and the lateral length L2 more than approximately 100 mm is enough to maintain the rigidity of the base 100 (especially, the periphery of the lateral end front parts 100A, 100A of the base) against the external force acting thereon while the vertical machining center machines the work. Even if the external force is made larger, it is possible to maintain sufficient rigidity in the base 100 by making the lateral length L2 approximately 200 mm-300 mm.

The laterally intermediate front part 100B is formed to be removable from the rest of the base 100. When the laterally intermediate front part 100B is installed, it is fixedly fastened to the rest of the base 100, the right and left side faces are closely attached to the inner side faces of the lateral end front parts 100A, 100A, and the rear face is closely attached to the base 100 except the laterally intermediate front part 100B. For removal, for example, the laterally intermediate front part 100B can be upwardly removed by a crane when the machining head 102 is displaced rearward in the direction Y2. The base 100, whose laterally intermediate front part 100B, as shown in FIG. 17, FIG. 18, FIG. 23 and FIG. 25, is pulled out, is formed so that the whole of the front face 1c is formed in a single plane orthogonal to the longitudinal direction, and thereafter, the vertical overall length portion of the laterally intermediate front part 100B between the pair of right and left lateral end front parts 100A, 100A comprising the vertical overall length portion at the right and left ends of the portion inside the peripheral cover 31 for covering the front face 1c is removed along the single plane.

A groove a2 is formed in the bottom face 1e of the base so as to extend in the Y-axis direction. A space a5 to which a part of the top face 1f of the base is opened is formed in the upper portion of the bed part a1 inside the base 100.

The guide-driving means 101 comprises the first saddle 4, the first guide part 5, the first drive part 6, the second saddle 7, the second guide part 8, the second drive part 9, the third guide part 10 and the third drive part.

Structurally, the first saddle 4 is formed in a block shaped as a trapezoid, as viewed from the side, and is arranged on the top face 1f of the base, wherein the bottom face is formed horizontal, the front face is formed in orthogonal to the Y-axis direction, the vertical intermediate position of the front face is formed in a recess as viewed from the side, and the right and left sides are triangular, view from the side.

The first guide part 5 comprises the pair of guide rails 12 provided on right and left sides of the top face 1f of the base in a fixed manner and the guide blocks 13 provided on the front and back of the right and left sides of the bottom face of the first saddle 4. Here, the guide rails 12 are straight along the Y-axis direction, and the guide blocks 13 are slidably and displaceably fitted on a guide rails 12.

The first drive part 6 comprises the first screw shaft 14, the first servo motor 15 for rotatably driving the first screw shaft 14, and the nut body 16 in which the first screw shaft 14 is screwed. The first screw shaft 14 is positioned at the center in the X-axis direction, and between the top face 1f of the base 100 and the bottom face of the first saddle 4 along the Y-axis direction, and is rotatably held at a specified position of the top face 1f through a bearing. The nut body 16 is fixed on the bottom face of the first saddle 4. The servo motor 15 is rotated by an order from a not-illustrated numerically controlled control device (NC control device), thereby moving the first saddle 4 in the Y-axis direction on the base 100.

The second saddle 7 is formed in the vertical block shaped roughly rectangularly, and is disposed nearly to the front face of the first saddle 4, the second saddle comprising the top part, the bottom part and the central part connecting these. The right and left ends of the top part and the bottom part are extended slightly from the central part to the right and left sides, and the top part is extended rearward from the central part and the bottom part.

The second guide part 8 comprises the lower guide rail 17a, the upper guide rail 17b and a pair of right and left guide blocks 18. The lower guide rail 17a is formed straight in the X-axis direction, fixedly provided on the lower portion of the front face 4c of the first saddle 4. The upper guide rail 17b is formed straight in the X-axis direction, fixedly provided on the front part of the top face 4b of the first saddle 4. The guide blocks 18 are slidably fitted to the guide rails 17a, 17b, respectively.

The second drive part 9 comprises the second screw shaft 19, the second servo motor 20 for rotatably driving the second screw shaft 19 and a nut body in which the second screw shaft 19 is screwed. The second screw shaft 19 is positioned at the center of the first saddle in the Z-axis direction, between the front face 4c of the first saddle 4 and the rear face of second saddle 7 along the X-axis direction, and is rotatably held at a specific position of the front face 4c of the first saddle 4 through the bearing. The nut body is fixed on the rear face of the second saddle 7. The second servo motor 20 is rotated by an order from the not-illustrated NC control device, thereby moving the second saddle 7 in the X-axis direction on the front face of the first saddle 4.

The third guide part 10 comprises a pair of guide rails 22 and guide blocks b1, b2. The guide rails 22 are formed straight in the Z-axis direction, fixedly provided on the right and left sides of the rear face of the head main body 23, which comprises the upper head main body 23b and the lower head main body 23a. The guide blocks b1, b2 are fixedly provided at upper and lower positions on right and left sides of the front face of the second saddle 7, and are slidably fitted in the corresponding guide rail, respectively.

The third drive part 11 comprises the not-illustrated third screw shaft, the third servo motor 24 for rotatably driving the third screw shaft, and the not-illustrated nut body in which the third screw shaft is screwed. The third screw shaft is positioned at the center in the X-axis direction, between the front face of the second saddle 7 and the rear face of the upper head main body part 23b along the Z-axis direction, and is rotatably held at a specific position on the front face of the second saddle 7 through the bearing. The nut body is fixed on the rear face of the upper head main body 23b. The third servo motor 24 is rotated by an order from the not-illustrated NC control device, thereby displacing the machining head 102 in the Z-axis direction on the front face of the second saddle 7.

The machining head 102 comprises the head main body 23, the vertically rotating shaft 26A and the spindle motor 27 for rotating the driving shaft 26A. The driving shaft 26A is only rotatably supported by the head main body 23 through the bearing, fixedly having the tool T on the lower end. The spindle motor 27 is fixed to the upper head main body 23b.

In the above-mentioned configuration, the jig 28 is provided on the front face 1c of the base 100 to support the work 'w' fixedly. The jig 28 is formed as a plane board so as to fixedly support the work 'w' through a screw member and so on. A means for optionally changing the height of the jig 28 in the central position in the X-axis direction of the base 100 at plural places is formed. Structurally, many screw holes c1 are arranged in a row in the Z-axis direction on the front face 1c of the base 100, and the height of the jig 28 is changed correspondingly to the screw holes c1, c10 by changing the screw holes c1, c10 in which screw members c2 for fixing the jig 28 are screwed. The jig 28 can be formed in a angled board as shown in FIG. 20, or the main part 28c can be formed as a thick block in a rectangular manner as shown in FIG. 21.

In this case, to fix the jig 28, it is contemplated that a not-illustrated comparatively thin board member be provided between the jig 28 and the front face 1c of the base 100 in a protruded manner, and that the convex-shaped or concave-shaped guide rail is provided to guide the jig 28 in the Z-axis direction. Different convex-shaped parts or concave-shaped parts whose longitudinal dimensions are comparatively small are sometimes formed on the front face 1c necessarily. The convex-shaped parts or the concave-shaped parts do not deviate from the configuration of the second and third groups of embodiments of the present invention, in which the front face 1c is formed in a single plane.

The jig 28 can be formed in a configuration for supporting the work supporting member so as to displace it in an optional direction through operation of the NC control device. For example, as shown in FIG. 22, a tilt-table comprising the bearing part d1 including a servo motor and the simple bearing d2 fixedly provided on right and left portions of the front face 1c of the base 100, the bearing part d1 and the simple bearing d2 extending forward in the Y1 direction. The work supporting part d3 is provided between the bearings d1, d2 through the rotatable supporting shaft that extends in the X-axis direction to make the work supporting part d3 rotatable around a right and left lateral line O1, the position of the work supporting device around the right and left lateral line being changed by an order from the NC control device. Instead of this, it is possible that the work 'w' fixed on the work supporting part d3 has right and left inclinations changed due to an order from the NC control device, or is changed around the specific axis in the Z-axis direction due to an order from the NC control device. These jigs 28 can be optionally formed so as to change and adjust their heights, if necessary. For example, it is expected that a structure for displacing the jig 28 in the Z-axis direction is responsive to the operation of a driving device such as a servo motor or a cylinder operated by oil pressure. Alternatively, the work 'w' fixed on the work supporting member d3 may be displaced in a specific direction by hand operation.

Although the jig shown in any of FIG. 17 to FIG. 22 is fixed on the front parts a3, a3 of the lateral end front parts of the base, it can be fixed on the front part a4 of the laterally intermediate part 100B of the base or the front parts a3, a4 of both parts.

The chip conveyer 29 for carrying chips to a specific place is provided under the base 100. The chips are produced when the work 'w' fixed on the jig 28 is cut. The chip conveyer 29 comprises the chip entrance 29a and the chip exit 29b. The chip entrance 29a is arranged right under the jig 28, and the chip exit 29b is arranged at a place suitable for carrying out the chips. The direction that the chip conveyer 29 carries out the chips is suitably decided in response to the on-site situation, sometimes extending in the Y-axis direction as illustrated, and sometimes extending in the X-axis direction. The chip conveyer 29 is provided with an endless carrying belt 29c that moves the chips received on its top face. Circumference of the endless carrying belt 29c is surrounded by a fluid-tight casing 29d. The inside of the casing 29d is used as a passage for coolant, and a tank 29e for storing the coolant is formed at a longitudinal position of the casing 29d.

In the vertical machining center shown in FIG. 17 to FIG. 22, generally as shown in FIG. 20, FIG. 21, FIG. 23 and FIG. 24, the hopper part 30 is formed on the front face 1c of the base 100 below the jig 28. The hopper part 30 receives chips and coolant and directs them into the chip entrance 29a through the bottom opening. The chips are produced when the work 'w' fixed on the jig 28 is cut, and the coolant is fed into a cut portion of the work 'w' that is cut with the tool T. The peripheral cover 31 is provided to surround the front space of the base 100 above the hopper part 30 and the upper space of the base 100. The peripheral cover 31 shown in FIG. 20, FIG. 21, FIG. 23 or FIG. 24 comprises the right and left side plane walls 31a, 31b, the front plane wall 31c, the X-axially extending vertical plane wall 31d fixed on the machining head 102, and the accordion-shaped horizontal wall 31e connecting the lower end edge of the vertical plane wall 31d and the upper inside of the front plane wall 31c. Here, the accordion-shaped horizontal wall 31e is extensively deformed in the Y-axis direction. In this case, the right and left end edges of the horizontal wall 31e are in close contact with the insides of the right and left side plane walls 31a, 31b, respectively. The switching ports for carrying the work 'w' into or out of the circumferential cover 31 are formed in the front plane wall 31c and the right and left side plane walls 31a, 31b, if necessary. In addition, as shown in FIG. 25, sliding walls 31g, 31g are positioned on the right and left sides of the bottom of the head main body 23 between the lower end edge of the vertical plane wall 31d and the front upper edge of the base 100 so as to be displaceable in relation to the head main body 23 in the X-axial direction. Even if the head main body 23 is displaced to an optional position in the X-axial direction, the sliding walls 31g, 31g are formed so as to prevent the chips and the coolant from splashing outwardly between the lower end edge of the vertical plane wall 31d and the front upper edge of the base 100. The sliding walls 31g are formed so as not to extend laterally outward of the right and left side plane walls 1a, 1b of the base 100, even if the head main body 23 is displaced greatly in the X-axis direction. A technique disclosed in Japanese patent No. 3168328 is used. When the sliding walls 31g are moved to a great extent in the X-axis direction by the head main body 23, they change their posture in a rising manner near the right and left side plane walls 1a, 1b of the base 100 due to the guiding action of the guide rail 31h.

In case of the vertical machining center of FIG. 24, as shown in FIG. 26, it is preferable that inside covers 32a, 32b for surrounding the circumference of the bearings d1, d2 are provided in the peripheral cover 31, if necessary. The inside covers 32a, 32b contribute effectually towards preventing the chips from entering between the relative sliding faces of the bearings d1, d2 and towards preventing the coolant from splashing and attaching to the circumference of the bearings d1, d2. Occasionally, the jig 28 is so formed that a table 'd' rotatable around a vertical axis is provided on the work supporting part d3 shown in FIG. 24, as shown in FIG. 27. A suitable inside cover for surrounding the drive part of the table 'd' is provided in the peripheral cover 31 so as to fluid-tightly separate the work machining area and the space for a device for driving the table 'd'. In this case also, the coolant and the chips are not sprinkled on the device for driving the table 'd'.

An automatic tool exchanger 33A is provided in a space a5 inside the base 100. Although the tool exchanger 33A can be variously formed, one tool changer of the present invention is made as follows. That is, as shown in FIG. 28 and FIG. 29, a claw part 37 for holding the tool T is arranged on a disk 36 that is supported in the base 100 through a drive part 35A with a servo motor 34A, and calculation for the tool T is performed through the servo motor 34A and reduction gears. A passage a7 is formed in the front of the base 100 including the lateral intermediate front part 100B to displace the vertical rotation driving shaft 26A of the machining head 102 and the clamped tool T for exchanging the tool.

The tool T is exchanged as follows. The vertical rotation driving shaft 26A arranged at a machining area P1 is moved to a tool exchange-starting position P2, and continuously moved to a tool exchange position P3, and then the tool T installed on the vertical rotation driving shaft 26A is unclamped in a state in which the tool T is held by the claw part 37 arranged at the tool exchange position P3. Thereafter, the vertical rotation driving shaft 26A is raised, the disk 36 holding the tool T is rotated, and then the installed tool T is calculated at the tool exchange position P3. Then, the vertical rotation driving shaft 26A is moved down to clamp the tool T arranged at the tool exchange position P3, and thereafter moved to a tool exchange finishing position, which is the same position as the tool exchange starting position P2, in order to prepare for the next machining order. In the case of this tool exchanger 33A, since a place to install the tool exchanger 33A is unnecessary other than the base 100, the space for the machine can be small.

A use example and an operation in which the work 'w' is machined by the vertical machining center shown in FIG. 17, FIG. 18, and FIG. 20 to FIG. 29 in a state in which the lateral intermediate front part 100B is not removed from the base 100 will be explained below.

An operator carries the work 'w' from outside the peripheral cover 31 and fixes it on the work supporting part d3 of the jig 28. After machining the work 'w', the operator removes the work 'w' from the jig 28 and moves it outside the peripheral cover 31. In this case, since the front face 1c of the base 100 is formed in a single plane, and the jig 28 is provided at a vertical intermediate position of the single plane, in the case of the jig 28 shown in FIG. 17 to FIG. 21, there are no component members of the vertical machining center on the front side and at the right and left sides of the jig 28 inside the peripheral cover 31. In addition, in the case of the jig 28 shown in FIG. 22, there are no component members of the vertical machining center, except the drive part and the bearing part, that are on the front side and at the right and left sides of the jig 28 inside the peripheral cover 31. Therefore, the work 'w' is comparatively easily transmitted from the outside of the peripheral cover 31 to the jig 28 by moving it from the front side of the jig 28 in the Y-axis direction through the switching entrance of the front plane wall 31c, or by moving it from the right or left side of the jig 28 in the X-axis direction through the switching entrance of the right or left side plane wall 31a or 31b. Besides, the work 'w' is comparatively easily transported outside the peripheral cover 31 by moving it from the jig 28 in the Y-axis direction through the switching entrance of the front plane wall 31c, or by moving it in the X-axis direction through the switching entrance of the right or left side plane wall 31a or 31b. Moreover, in each of examples of FIG. 17 to FIG. 22, the configuration in which the front face 1c of the base 100 is formed in a single plane and the jig 28 is provided at the vertical intermediate position of the single plane contributes effectually towards making the X-axial length of the work 'w' that can be fixed on the jig 28 comparatively large.

When changing the machining area for the tool T is required because the size of the work 'w' is changed, the height of the jig 28 is changed by changing the screw hole c1 in which the screw member c2 for fixing the jig 28 is screwed. In this case, when the height of the jig 28 above the floor is diminished, the vertical distance from the jig 28 to the tool T of the machining head at the initial position is increased, and therefore, the machining area is increased. Conversely, when the height of the jig 28 is increased, the vertical distance from the jig 28 to the tool T of the machining head at the initial position of the tool is decreased, and therefore, the machining area is decreased.

In machining the work 'w' fixed on the jig 28, a not-illustrated NC control device is started in operation. That is, the NC control device operates the first servo motor 15, the second servo motor, and the third servo motor 24 to suitably move the machining head 102 in the Y-axis direction, the X-axis direction and the Z-axis direction, and operates a spindle motor 27 to rotate the vertical rotational driving shaft 26A and the tool T installed thereon according to a previous input program. In addition, if necessary, the work supporting part d3 and the work fixed thereon are rotated around the lateral line O1 by rotating the servo motor of the bearing part d1 of the jig 28 shown in FIG. 22. Furthermore, if necessary, the tool exchanger 33A is operated to exchange the tool T of the machining head 102, or a not-illustrated coolant supply means is suitably operated to supply coolant.

The work 'w' is machined in a predetermined shape by the tool T through the NC control device. During machining, the force imposed on the tool T is transmitted through the machining head 102, the second saddle 7, the first saddle 4, the base 100, the jig 28 and the work 'w' in a loop-line LP1, as shown in FIG. 30.

While the work 'w' is machined by the machining head 102, coolant is supplied from a not-illustrated coolant supply means to cut the work 'w' smoothly and cool the cut area, and chips are produced because the tool T cuts the work 'w'. Such coolant and chips fall by gravity while being thrown outward by the rotation of the tool T. The coolant and chips that are thrown outward are contained by the peripheral cover 31 (the front plane wall 31c, the right and left side plane walls 31a, 31b, the accordion horizontal plane wall 31e and so on) and the base 100 and so on, thereafter dropping into the hopper part 30. When the coolant is supplied to the portion cut by the tool T in a fluid manner, it flows down so as to wash the chips away. When the coolant is supplied as a mist, it falls adhered to the chips.

The coolant and chips falling into the hopper part 30 are gathered at the bottom of the hopper part 30 by gravity, dropping into the chip entrance 29a of the chip conveyer 29 from the bottom opening of the hopper part. In this case, the coolant and the chips smoothly drop into the chip entrance 29a without accumulating on the surface of the base 100 because the front face 1c of the base 100 is formed in the single plane in the Z-axis direction. Accordingly, the conventional phenomenon that the chips, heated to a high temperature by friction, accumulate on the base 100 and heat it does not occur, and therefore, the base 100 is prevented from thermally deforming due to the chips. Accordingly, the machining precision is maintained good.

The coolant arriving at the chip entrance 29a passes through a space of the endless carrying belt 29c, arriving at the bottom of the casing 29d and flowing in the tank 29e. The chips are supported on the endless carrying belt 29c, and carried towards the chip exit 29b by movement of the endless carrying belt 29c. The coolant adhered to the chips is separated by gravity in the process of the chips being carried by the endless carrying belt 29c, dropping to the bottom of the casing 29d, and flowing into the tank 29e. The coolant stored in the tank 29e is used again, and the chips discharged from the chip exit 29b are contained in a receptacle arranged under it.

In using the jig 28 as shown in FIG. 26 and FIG. 27, even though the work supporting part d3 and the work 'w' fixed thereon are intended to rotate around the lateral line O1, it is occasionally not possible to rotate them because the distance from the line O1 to the front face 1c of the base 100 is insufficient.

In this case, the machining head 102 is moved rearward in the Y2 direction by the guide driving means 101 to shift the machining head rearward from right above the laterally intermediate front part 100B of the base. In this state, a bolt attaching the laterally intermediate front part 100B to the base main body is removed from the rest of the base 100 part (the base main body), and the lateral intermediate front part 100B is removed from the base main body by an overhead crane.

After the laterally intermediate front part 100B is removed from the base 100, as shown in FIG. 31 and FIG. 32, a portion of the base 100 between the pair of the right and left lateral end front parts 100A, 100A is formed as a rectangular parallelepiped space k1. Accordingly, the distance L3 between the lateral line (rotary center of the work supporting part d3) O1 and the front end face a6 of the base 100 portion forming the space between the pair of the right and left lateral end front parts 100A, 100A is increased by the longitudinal length L1 of the lateral end front parts 100A, 100A in the Y-axis direction (the dimension in he Y-axis direction of the laterally intermediate front part 100B of the base). Accordingly, the maximum radius around the lateral line O1 is increased by the longitudinal length L1 of the lateral end front part 100A of the base when the laterally intermediate front part 100B is removed. The jig 28 and the work 'w' fixed thereon rotate around the lateral line O1 through a virtual position ka as long as the radius is within the range of the increased maximum radius, and therefore, the size of the work 'w' can be increased.

The vertical machining center with the laterally intermediate front part 100B removed is used in the same manner as the vertical machining center with the laterally intermediate front part in place. The use situation is illustrated in for example FIG. 33 to FIG. 36, whereas a description of it is omitted.

FIG. 37 shows a jig 28 that is used in the vertical machining center only when the laterally intermediate front part 100B of the base is removed. The jig 28 is arranged between the pair of right and left lateral front parts 100A, 100A and extends rearward of the front part a3. Structurally, a stationary plate 28A that is C shaped when viewed from above has right and left ends fixed to the front part a3 forming the front end faces of the lateral end front parts 100A, 100A, a laterally center part 28b extending rearward, and a table 'd' fixed on the front face of the laterally center part 28b to be rotated around an axial line O2, and the laterally center part 28b and the table 'd' are arranged rearward of the front part a3. The jig 28 contributes effectually towards diminishing the forward extension of the work 'w' from the front part a3 in spite of the table 'd'.

In machining with the vertical machining center when the laterally intermediate front part 100B of the base is removed as shown in FIG. 33 to FIG. 37, the force imposed on the tool T is transmitted through the machining head 102, the second saddle 7, the first saddle 4, the base 100, the jig 28 and the work 'w' along the loop-line LP1, as shown in FIG. 30. There is no change in the length of the loop-line LP1 whether the laterally intermediate front part 100B is removed or not. Since the longitudinal length L1 of each of the lateral end front parts 100A, 100A is approximately 100 mm-300 mm, and the lateral length L2 is more than 100 mm, the whole rigidity of the base 100 and the jig 28 does not fall to such a degree that the machining precision is spoiled due to the external force that is usually imposed on the base during machining, even if the laterally intermediate front part 100B is removed.

Another example in which the vertical machining centers are arranged in plural rows will be explained. FIG. 38 and FIG. 39 show a situation where six vertical machining centers are arranged in 1a row. FIG. 38A and FIG. 39A are plane views, and FIG. 38B Band FIG. 39B are side views, respectively. Besides, a part of the side view of FIG. 39 is omitted.

In FIG. 38, the vertical machining centers M1 to M6 are arranged so as to make the Y-axis direction orthogonal to the machining line 'k', and the independent chip conveyer 29 for carrying the chips produced by the vertical machining centers M1 to M6 in the Y-axis direction is provided. The chips are carried rearward of the base 100 by the chip conveyers 29 corresponding to the independent vertical machining centers M1 to M6 to be gathered in the receptacles 33. On the machining line 'k', the power transportation device 34 for carrying the work 'w' along the X-axis direction and along the Z-axis direction is provided. The numerals e1 and e2 are power-driven opening and closing openings provided in the side plane walls 31a, 31b, respectively, and 35 is a temporary table for work.

On the other hand, in FIG. 39, four vertical machining centers M1 to M4 are provided with a common single chip conveyer 29 for carrying the chips produced by the machining centers M1 to M4 in the X-axis direction, and another two machining centers M5, M6 are provided with another common single chip conveyer 29 for carrying the chips produced by the machining centers M5, M6 in the X-axis direction. In this case, the chips produced by the vertical machining centers M1 to M6 drop into their correspondent chip entrances 29a, from which they are carried out by the correspondent chip conveyers 29 and gathered in the receptacles 33. Other component members do not change from those shown in FIG. 22.

In both of FIG. 38 and FIG. 39, the power transportation device 34 lets the works 'w' be arranged on the work supporting members d3 of the jigs 28 of the vertical machining centers M1 to M6 in order by forwardly carrying them in the X-axis direction on the machining line 'k'. Accordingly, each of the works 'w' is intermittently carried to the left side of the figures on the machining line, and automatically machined by the six vertical machining centers M1 to M6 in order.

The vertical machining centers M1 to M6 in FIG. 38 and FIG. 39 are arranged in a row with the right and left side faces of each machining center close to side faces of adjacent machining centers. Since the supporting members 2 serving as legs of the base 100 are formed so as not to extend from the right and left side faces 1a, 1b of the base 100, they do not interfere with the supporting members of adjacent machining centers. Furthermore, since the front sides of the pair of right and left supporting members 2, 2 extend forward in the direction Y1 from the front face c1 of the base 100, they contribute effectually towards supporting the base 100 stably in comparison with the case in which the supporting members do not extend forward. Moreover, since the rear sides of the supporting members 2, 2 are formed so as not to extend rearward in the Y2 direction from the rear face 1d of the base 100, they do not interfere with the tank 29e, even if the tank 29e of the chip conveyer 29 contacts the rear face 1d.

The invention claimed is:

1. A machine tool, comprising:
   a base fixed on a floor, the base having a front, a top face, and sides each having a front end;
   a machining head having a vertical rotation driving shaft, said vertical rotation driving shaft having a tool fixed on a bottom part thereof, said vertical rotation driving shaft being provided for rotating the tool about a vertical axis; and
   guide-driving means, positioned on the top face of the base, for displacing the machining head in a longitudinal direction, in a lateral direction and a vertical direction, said guide-driving means comprising guide parts;
   wherein the guide parts include a first saddle guided in the longitudinal direction on the top face of the base, and a second saddle guided in the lateral direction on the first saddle, said second saddle guiding the machining head in the vertical direction, wherein the base has a front most face that is formed in a single plane, which front most face is orthogonal to the longitudinal direction at the front ends of the sides of the base, and a jig for fixing a work to be machined with the tool attached to the front most face so as to extend frontwardly from a vertically intermediate position of the front most face, which vertically intermediate position is spaced from the bottom of the front most face.

2. A machine tool as claimed in claim 1, wherein the front most face has a portion that is inside a circumference cover for covering a space in front of the base.

3. A machine tool as claimed in claim 1, wherein the machining head is vertically displaced in front of the single plane while the tool machines the work, and the work is machined at a position that is lower than the guide parts of the guide-driving means.

4. A machine tool as claimed in claim 1, wherein the top face of the base is about 1.0 m-1.5 m above the floor.

5. A machine tool as claimed in claim 1, wherein a groove is formed in a bottom face of the base, and a chip conveyer for discharging chips from a front bottom of the base to a rear side of the base is arranged in the groove.

6. A machine tool as claimed in claim 5, wherein the chip conveyer arranged in the groove is installed on the floor, and a chip entrance of the conveyer is arranged under the jig.

7. A machine tool as claimed in claim 1, wherein a plurality of screw holes are arranged in a row in the vertical direction on the front most face of the base, a screw member for fixing the jig is screwed into one of the screw holes, and the height at which the jig is fixed is adjustable by screwing the screw member into a different one of the screw holes.

8. A machine tool as claimed in claim 1, wherein the jig comprises a pair of vertical long board members spaced laterally from one another and fixed to the front most face of the base, and the rest of the jig is fixed on front faces of the board members.

* * * * *